(12) United States Patent
Miyasa et al.

(10) Patent No.: US 11,130,359 B2
(45) Date of Patent: Sep. 28, 2021

(54) LIQUID DISCHARGE APPARATUS, INK JET RECORDING METHOD, AND PIGMENT TEXTILE PRINTING INK COMPOSITION

(71) Applicant: Seiko Epson Corporation, Tokyo (JP)

(72) Inventors: Ryota Miyasa, Matsumoto (JP); Hideki Okada, Shiojiri (JP); Masakazu Ohashi, Shiojiri (JP)

(73) Assignee: Seiko Epson Corporation

( * ) Notice: Subject to any disclaimer, the term of this patent is extended or adjusted under 35 U.S.C. 154(b) by 4 days.

(21) Appl. No.: 16/727,095

(22) Filed: Dec. 26, 2019

(65) Prior Publication Data

US 2020/0207136 A1 Jul. 2, 2020

(30) Foreign Application Priority Data

Dec. 27, 2018 (JP) .............................. JP2018-244251

(51) Int. Cl.
*B41M 5/00* (2006.01)
*B41J 3/407* (2006.01)
(Continued)

(52) U.S. Cl.
CPC .............. *B41M 5/0023* (2013.01); *B41J 2/01* (2013.01); *B41J 3/4078* (2013.01);
(Continued)

(58) Field of Classification Search
CPC ....... B41J 2/01; B41J 2/211; B41J 2/17; B41J 2/17593; B41J 2/2107; B41J 2/1755; B41J 2/2114; B41J 2/2117; B41J 2/2056; B41J 2/0057; B41J 3/60; B41J 2002/012; B41J 2/04598; B41J 2/1623; B41J 2202/00; B41J 2202/03; B41J 2/045; B41J 11/0015;
(Continued)

(56) References Cited

U.S. PATENT DOCUMENTS

2005/0036011 A1* 2/2005 Watanabe ............ B41J 2/14209
347/71
2010/0091052 A1 4/2010 Ogawa et al.
(Continued)

FOREIGN PATENT DOCUMENTS

EP 3351389 A1 7/2018
JP 2009-030014 A 2/2009
JP 2016-190900 A 11/2016

*Primary Examiner* — Manish S Shah
(74) *Attorney, Agent, or Firm* — Harness, Dickey & Pierce, P.L.C.

(57) ABSTRACT

A liquid discharge apparatus of the present disclosure includes an ink composition and a liquid discharge section including a nozzle for discharging the ink composition. The ink composition is a pigment textile printing ink composition containing resin particles, water, and an organic solvent. The resin particles have a glass transition temperature of 5° C. or less and are contained in an amount of 6.5 mass % or more based on the total amount of the ink composition. The ink composition contains a polyhydric alcohol having a boiling point of 270° C. or more as the organic solvent in an amount of 15.0 mass % or less based on the total amount of the ink composition. The liquid discharge section includes a pressure chamber and a circulation passage for circulating the ink composition in the pressure chamber.

10 Claims, 3 Drawing Sheets

(51) Int. Cl.
*C09D 11/102* (2014.01)
*C09D 11/107* (2014.01)
*C09D 11/322* (2014.01)
*B41J 2/01* (2006.01)

(52) U.S. Cl.
CPC .......... *C09D 11/102* (2013.01); *C09D 11/107* (2013.01); *C09D 11/322* (2013.01)

(58) Field of Classification Search
CPC ...... B41J 11/002; B41J 2/04581; B41J 2/055; B41J 2/14201; B41J 2002/16502; B41J 29/02; B41J 2/17513; B41J 2/17509; B41J 29/13; B41J 2/17553; B41J 2/1606; B41J 2/1642; B41J 2/1609; B41J 2/1433; B41J 2/164; B41J 2/162; B41J 2/161; B41J 2/19; B41J 15/04; B41J 25/001; B41J 25/34; B41J 25/003; B41J 2/21; B41J 25/312; B41J 2025/008; B41J 2202/21; B41J 2/17596; B41J 2/16508; B41J 2/1652; B41J 2/16538; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033

See application file for complete search history.

(56) References Cited

U.S. PATENT DOCUMENTS

| | | | |
|---|---|---|---|
| 2011/0200751 A1* | 8/2011 | Yatake | C09D 11/322 427/261 |
| 2012/0249701 A1* | 10/2012 | Sasada | B41J 2/2107 347/102 |
| 2013/0158177 A1* | 6/2013 | Ohzeki | C09D 11/322 524/277 |
| 2014/0210901 A1* | 7/2014 | Ohashi | B41J 2/2107 347/20 |
| 2014/0240399 A1* | 8/2014 | Saito | B41J 2/2103 347/44 |
| 2014/0375715 A1* | 12/2014 | Kitada | B41J 2/04581 347/10 |
| 2015/0077480 A1* | 3/2015 | Fujii | B41J 2/2107 347/86 |
| 2016/0244626 A1* | 8/2016 | Kagata | C09D 11/322 |
| 2016/0311233 A1 | 10/2016 | Murai et al. | |
| 2017/0210919 A1* | 7/2017 | Yoshimasa | C09D 11/107 |
| 2018/0058002 A1* | 3/2018 | Ohashi | B41J 2/01 |
| 2018/0282567 A1* | 10/2018 | Ishida | C09D 11/322 |

* cited by examiner

LIQUID DISCHARGE APPARATUS, INK JET RECORDING METHOD, AND PIGMENT TEXTILE PRINTING INK COMPOSITION

The present application is based on, and claims priority from, JP Application Serial Number 2018-244251, filed Dec. 27, 2018, the disclosure of which is hereby incorporated by reference herein in its entirety.

BACKGROUND

1. Technical Field

The present disclosure relates to a liquid discharge apparatus, an ink jet recording method, and a pigment textile printing ink composition.

2. Related Art

Textile printing for recording images on fabric, such as woven fabric, knitted fabric, and nonwoven fabric, are known. In recent years, an ink jet recording method is used also in textile printing from the viewpoint of, for example, being capable of efficiently utilizing an ink composition (hereinafter, also simply referred to as "ink") for textile printing.

In addition, a pigment textile printing ink composition containing a pigment as the color material is used in an ink jet recording method because of the excellent color development properties of images. A technique of improving the fastness properties and color development properties by the pigment textile printing ink composition containing specific resin particles is known (e.g., JP-A-2009-30014).

The ink jet recording method using a pigment textile printing ink composition is required that ink discharge stability and abrasion resistance and texture are compatible with each other.

SUMMARY

1. The present disclosure provides a liquid discharge apparatus that includes an ink composition and a liquid discharge section including a nozzle for discharging the ink composition, in which the ink composition is pigment textile printing ink composition containing resin particles, water, and an organic solvent, the resin particles have a glass transition temperature of 5° C. or less and are contained in an amount of 6.5 mass % or more based on the total amount of the ink composition, the ink composition contains a polyhydric alcohol having a boiling point of 270° C. or more as the organic solvent in an amount of 15.0 mass % or less based on the total amount of the ink composition, and the liquid discharge section further includes a pressure chamber and a circulation passage for circulating an ink composition in the pressure chamber.

2. In the liquid discharge apparatus described in the above 1, the ink composition has a film elongation of 400% or more and 600% or less and a film strength of 50 MPa or more.

3. In the liquid discharge apparatus described in the above 1 or 2, the content of the polyhydric alcohol having a boiling point of 270° C. or more is 10.0 mass % or less based on the total amount of the ink composition.

4. In the liquid discharge apparatus described in any one of the above 1 to 3, the content of the polyhydric alcohol having a boiling point of 270° C. or more is 30.0 mass % or less based on the total amount of polyhydric alcohol.

5. In the liquid discharge apparatus described in any one of the above 1 to 4, the content mass ratio of the polyhydric alcohol having a boiling point of 270° C. or more to the solid content of the resin particles is 0.9 or less.

6. In the liquid discharge apparatus described in any one of the above 1 to 5, the resin particles are urethane resin particles.

7. In the liquid discharge apparatus described in the above 6, the resin particles are polycarbonate urethane resin particles.

8. In the liquid discharge apparatus described in any one of the above 1 to 7, the ink composition further contains a crosslinking agent.

9. The present disclosure further provides an ink jet recording method including an ink adhesion step of discharging a pigment textile printing ink composition containing resin particles, water, and an organic solvent from a nozzle of a liquid discharge section to adhere the ink composition to fabric, in which the resin particles have a glass transition temperature of 5° C. or less and are contained in an amount of 6.5 mass % or more based on the total amount of the ink composition, the ink composition contains a polyhydric alcohol having a boiling point of 270° C. or more as the organic solvent in an amount of 15.0 mass % or less based on the total amount of the ink composition, and the liquid discharge section includes a pressure chamber and a circulation passage for circulating an ink composition in the pressure chamber.

10. The present disclosure further provides a pigment textile printing ink composition to be adhered to fabric by being discharged from a nozzle of a liquid discharge section including a pressure chamber and a circulation passage for circulating the ink composition in the pressure chamber, in which the pigment textile printing ink composition contains resin particles, water, and an organic solvent, the resin particles have a glass transition temperature of 5° C. or less and are contained in an amount of 6.5 mass % or more based on the total amount of the pigment textile printing ink composition, and a polyhydric alcohol having a boiling point of 270° C. or more is contained as the organic solvent in an amount of 15.0 mass % or less based on the total amount of the ink composition.

DESCRIPTION OF EXEMPLARY EMBODIMENTS

Figure 1:
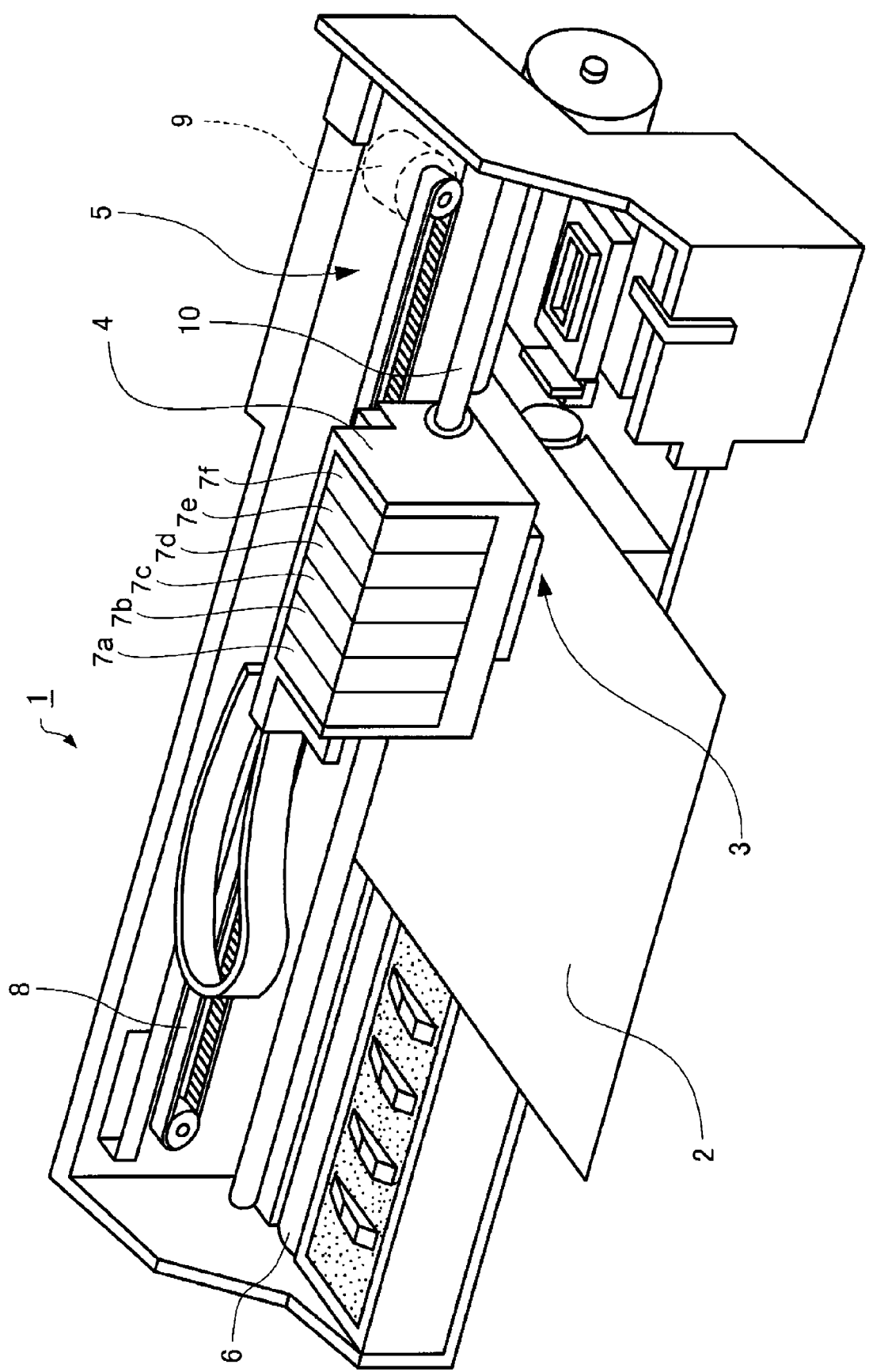
FIG. 1 is a schematic perspective view of an ink jet textile printing apparatus for performing the ink jet recording method according to an embodiment of the present disclosure.

Some embodiments of the present disclosure will now be described. The embodiments shown below merely describe examples of the present disclosure. The present disclosure is not limited to the following embodiments and encompasses various modifications implemented within a range not changing the gist of the present disclosure. Incidentally, not all the components described below are indispensable components of the present disclosure.

An aspect of the liquid discharge apparatus according to the embodiment is a liquid discharge apparatus including an ink composition and a liquid discharge section including a nozzle for discharging the ink composition and is characterized by that the ink composition is a pigment textile printing ink composition containing resin particles, water, and an organic solvent; the resin particles have a glass transition temperature of 5° C. or less and are contained in an amount of 6.5 mass % or more based on the total amount of the ink composition; the ink composition contains a polyhydric alcohol having a boiling point of 270° C. or more as the organic solvent in an amount of 15.0 mass % or less based on the total amount of the ink composition; and the liquid discharge section includes a pressure chamber and a circulation passage for circulating the ink composition in the pressure chamber.

An aspect of the ink jet recording method according to the embodiment is an ink jet recording method including an ink adhesion step of discharging a pigment textile printing ink composition containing resin particles, water, and an organic solvent from a nozzle of a liquid discharge section to adhere the ink composition to fabric and is characterized by that the resin particles have a glass transition temperature of 5° C. or less and are contained in an amount of 6.5 mass % or more based on the total amount of the ink composition; the ink composition contains a polyhydric alcohol having a boiling point of 270° C. or more as the organic solvent in an amount of 15.0 mass % or less based on the total amount of the ink composition; and the liquid discharge section includes a pressure chamber and a circulation passage for circulating the ink composition in the pressure chamber.

An aspect of the pigment textile printing ink composition according to the embodiment is a pigment textile printing ink composition to be adhered to fabric by being discharged from a nozzle of a liquid discharge section including a pressure chamber and a circulation passage for circulating the ink composition in the pressure chamber and is characterized by that the pigment textile printing ink composition contains resin particles, water, and an organic solvent; the resin particles have a glass transition temperature of 5° C. or less and are contained in an amount of 6.5 mass % or more based on the total amount of the pigment textile printing ink composition; and as the organic solvent, a polyhydric alcohol having a boiling point of 270° C. or more is contained in an amount of 15.0 mass % or less based on the total amount of the ink composition.

The liquid discharge apparatus, the ink jet recording method, and the pigment textile printing ink composition according to the embodiment will now be described in the order of the liquid discharge apparatus, the pigment textile printing ink composition (hereinafter, also referred to as "ink composition" or "ink"), fabric to which the textile printing is performed, and the ink jet recording method.

1. LIQUID DISCHARGE APPARATUS

The liquid discharge apparatus according to the embodiment is a liquid discharge apparatus including an ink composition and a liquid discharge section having a nozzle for discharging the ink composition and is characterized by that the ink composition is a pigment textile printing ink composition containing resin particles, water, and an organic solvent; the resin particles have a glass transition temperature of 5° C. or less and are contained in an amount of 6.5 mass % or more based on the total amount of the ink composition; the ink composition contains a polyhydric alcohol having a boiling point of 270° C. or more as the organic solvent in an amount of 15.0 mass % or less based on the total amount of the ink composition; and the liquid discharge section includes a pressure chamber and a circulation passage for circulating the ink composition in the pressure chamber.

In the embodiment, the liquid discharge apparatus will be described using an ink jet textile printing apparatus of which the recording head is an ink jet head using an ink jet recording method as an example. This ink jet textile printing apparatus may have a configuration including a process liquid adhesion device for treating fabric as an object of textile printing or may be an ink jet textile printing system including a process liquid adhesion device provided separately from the ink jet textile printing apparatus. In addition, in the embodiment, the process liquid adhesion device is not an indispensable component.

When a process liquid adhesion device is provided to an ink jet textile printing apparatus and ink jet application by discharging the ink from the nozzle of an ink head is performed, it is possible to uniformly adhere the process liquid composition to fabric. Examples of another process liquid adhesion device include an immersion device in which fabric is immersed in the process liquid composition, a roller in which the process liquid composition is applied with, for example, a roll coater, and a spray in which the process liquid composition is ejected by, for example, a spray device.

In addition, the ink jet textile printing apparatus that is used in the embodiment will be described using an on-carriage type printer in which an ink cartridge is loaded on a carriage as an example. In the embodiment, the ink jet textile printing apparatus is not limited to the on-carriage type printer and may be an off-carriage type printer in which an ink cartridge is fixed to the outside.

Incidentally, the printer that is used in the description below is a serial printer including a recording ink jet head loaded on a carriage that moves in a predetermined direction and discharging droplets on a recording medium by movement of the ink jet head according to the movement of the carriage. The ink jet textile printing apparatus used in the present disclosure is not limited to the serial printer and may be a line printer. In the line printer, the ink jet head is wider than the width of recording media, and the ink jet head discharges droplets on a recording medium without moving.

An example of the ink jet textile printing apparatus used in the embodiment will now be described with reference to the drawings. The ink jet textile printing apparatus used in the embodiment is not limited to the following aspects. In each drawing used in the following description, the scale of each member is appropriately changed in order to make each member a recognizable size.

The ink jet textile printing apparatus is an apparatus for performing textile printing by landing droplets on fabric with an ink jet head as a liquid discharge section discharging micro-droplets of an ink composition. FIG. 1 is a schematic perspective view illustrating an ink jet textile printing apparatus used in an embodiment.

As shown in FIG. 1, the printer 1 in the embodiment includes an ink jet head 3, a carriage 4, a main scanning mechanism 5, a platen roller 6, and a controller (not shown) for controlling the operation of the whole printer 1. The carriage 4 carries the ink jet head 3 and detachably carries ink cartridges 7a, 7b, 7c, 7d, 7e, and 7f containing ink compositions to be supplied to the ink jet head 3.

The main scanning mechanism 5 includes a timing belt 8 connected to the carriage 4, a motor 9 for driving the timing belt 8, and a guide shaft 10. The guide shaft 10 lays as a supporting member for the carriage 4 in the scanning direction of the carriage 4, i.e., in the main scanning direction. The carriage 4 is driven by the motor 9 via the timing belt 8 and can be reciprocated along the guide shaft 10. Consequently, the main scanning mechanism 5 has a function of reciprocating the carriage 4 in the main scanning direction.

The platen roller 6 has a function of transporting fabric 2 for textile printing in a sub-scanning direction orthogonal to the main scanning direction, i.e., in the longitudinal direction of the fabric 2. Consequently, the fabric 2 is transported in the sub-scanning direction. The carriage 4 carrying the ink jet head 3 can be reciprocated in the main scanning direction which approximately corresponds to the width direction of the fabric 2, and the ink jet head 3 is configured to be able to scan the fabric 2 in the main scanning direction and the sub-scanning direction.

The ink cartridges 7a, 7b, 7c, 7d, 7e, and 7f are independent six ink cartridges. The ink cartridges 7a, 7b, 7c, 7d, 7e, and 7f can contain ink compositions constituting an ink set according to the embodiment. These ink cartridges individually contain ink compositions having colors, such as black, cyan, magenta, yellow, white, and orange, in an arbitrary combination. In FIG. 1, the number of ink cartridges is six but is not limited thereto. The bottoms of the ink cartridges 7a, 7b, 7c, 7d, 7e, and 7f are provided with supply ports (not shown) for supplying the ink compositions contained in each ink cartridge to the ink jet head 3. In addition, when the process liquid adhesion device performs ink jet application, one of the ink cartridges 7a, 7b, 7c, 7d, 7e, and 7f can contain process liquid.

The ink jet head 3 is a means for ejecting inks supplied from the ink cartridges 7a, 7b, 7c, 7d, 7e, and 7f from multiple nozzles N and adhering the inks to fabric 2 under control by the controller (not shown). The ink jet head 3 includes multiple nozzles (see FIG. 2) on the side facing fabric 2 to which inks are adhered, the nozzles discharging ink to adhere them to the fabric 2. These nozzles are arranged in a line to form nozzle lines, and the nozzle lines are individually arranged to correspond to the color ink compositions and the process liquid. The ink compositions are supplied to the ink jet head 3 from the respective ink cartridges and are discharged as droplets from the nozzles by the actuator (not shown) in the ink jet head 3. The discharged droplets of the ink compositions and process liquid land on the fabric 2 to pretreat the fabric 2 and to form an image, text, pattern, color, etc. by the ink in the textile printing region of the fabric 2.

Here, the ink jet head 3 uses a piezoelectric element as the actuator serving as a driving means but is not limited to this system. For example, an electromechanical conversion element that displaces a diaphragm as the actuator by electrostatic adsorption or an electrothermal conversion element that discharges an ink composition as droplets by air bubbles generated by heating may be used.

In the embodiment, the ink jet head 3 is a head having a circulation passage for circulating the ink composition. When the ink jet head 3 includes a circulation passage, the ink in the pressure chamber or nozzle is refreshed, clogging due to aggregates of resin particles is suppressed, and the discharge stability can be improved. Consequently, even if ink that tends to generate foreign matter is used, it is possible to provide an ink jet recording method showing excellent discharge stability.

Figure 2:
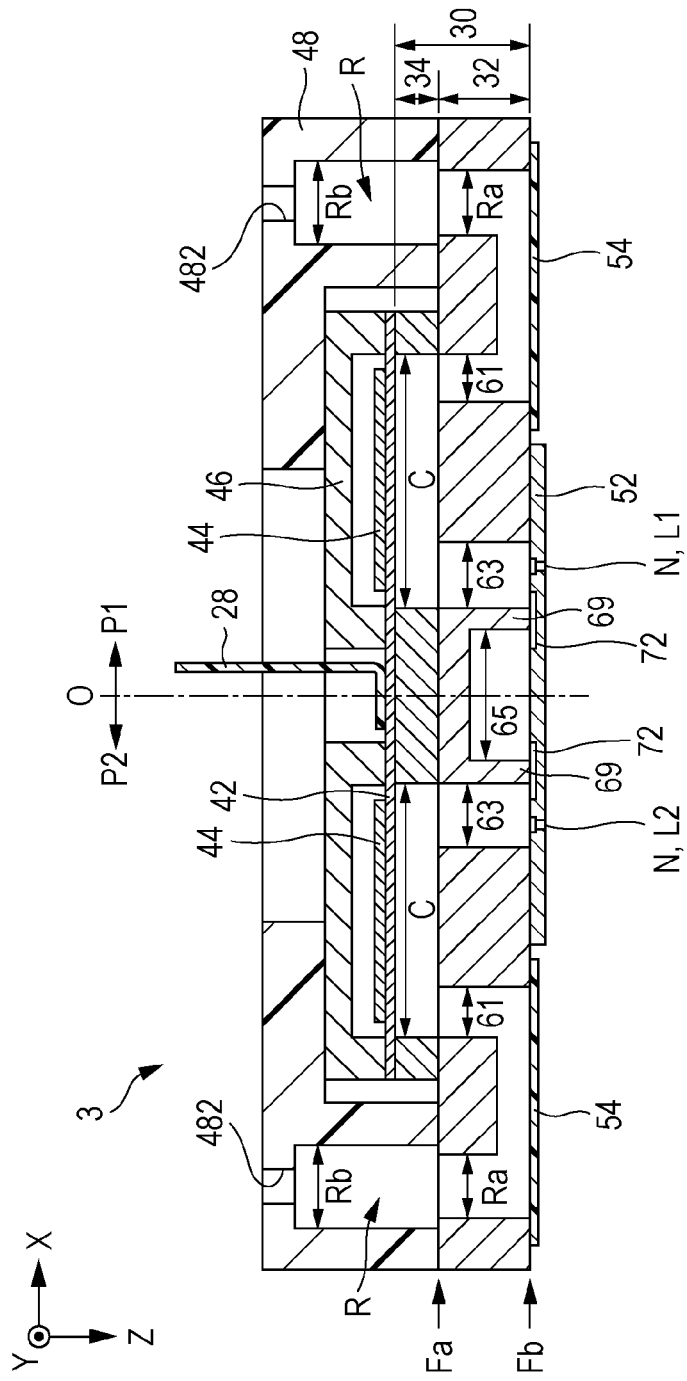
FIG. 2 is a cross-sectional view of the ink jet head of the ink jet textile printing apparatus.
Figure 3:
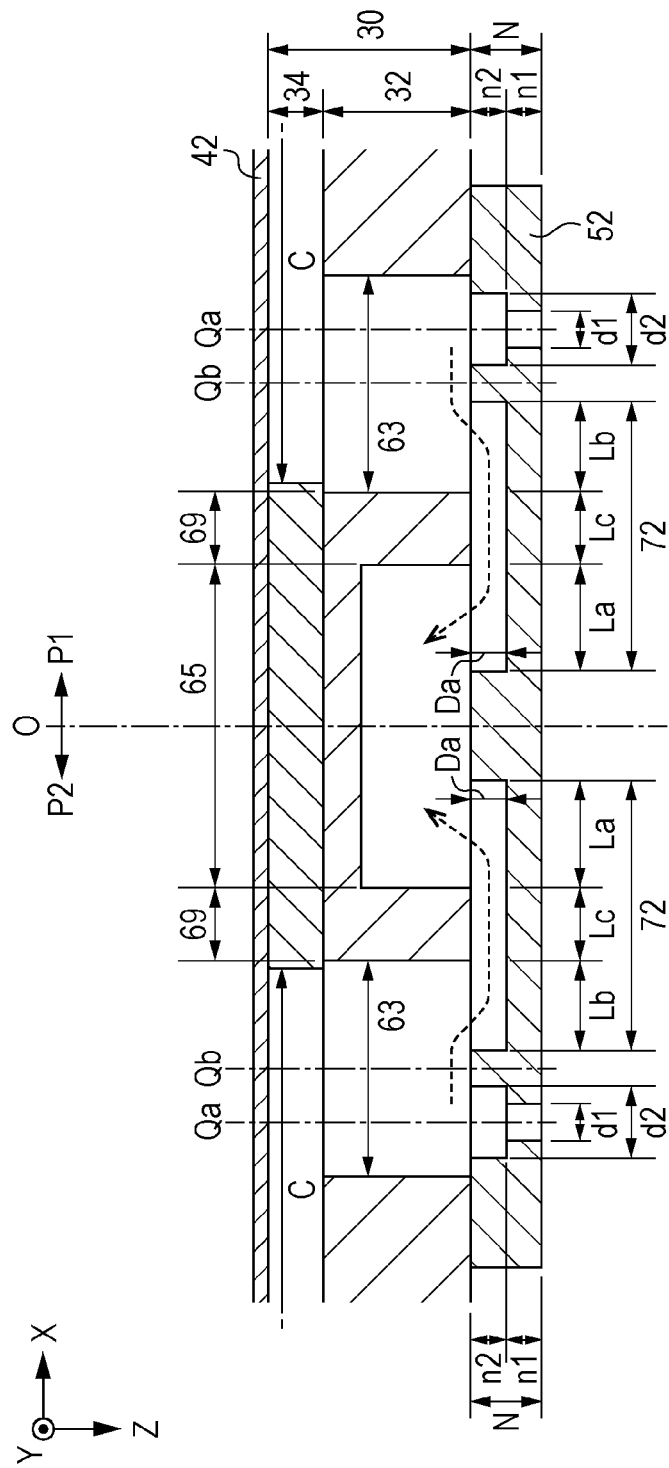
FIG. 3 is a cross-sectional view of the vicinity of a circulation liquid chamber in the ink jet head.

FIG. 2 is a cross-sectional view of the ink jet head 3 in a cross-section perpendicular to the Y-direction, and FIG. 3 is a partial exploded perspective view of the ink jet head 3. In FIG. 2, for example, a plane parallel to the surface of the fabric 2 is referred to as an X-Y plane, and a direction perpendicular to the X-Y plane is referred to as a Z direction hereinafter. The ejection direction of ink by the ink jet head 3 corresponds to the Z direction. The main scanning direction corresponds to the X direction, and a direction (sub-scanning direction) orthogonal to the main scanning direction corresponds to the Y direction.

The multiple nozzles N of the ink jet head 3 are arranged in the Y direction to constitute a nozzle line. In the ink jet head 3, a plane passing through a central axis parallel to the Y direction and being parallel to the Z direction, i.e., the Y-Z plane O is referred to as "central plane" in the following description.

As shown in FIG. 2, the ink jet head 3 has a configuration in which elements related to each nozzle N of a first line L1 and elements related to each nozzle N of second line L2 are arranged symmetrically with respect to the central plane O. That is, in the ink jet head 3, the configurations of the part on the positive side (hereinafter, also referred to as "first portion") P1 in the X direction and the part on the negative side (hereinafter, also referred to as "second portion") P2 in the X direction are substantially the same with respect to the central plane O. The multiple nozzles N of the first line L1 are formed in the first portion P1, and the multiple nozzles N of the second line L2 are formed in the second portion P2. The central plane O corresponds to the interface between the first portion P1 and the second portion P2.

As shown in FIG. 2, the ink jet head 3 includes a flow channel forming portion 30. The flow channel forming portion 30 is a structure that forms a flow channel for supplying ink to multiple nozzles N. In the embodiment, the flow channel forming portion 30 is constituted by laminating a first flow channel substrate 32 and a second flow channel substrate 34. The first flow channel substrate 32 and the second flow channel substrate 34 are each a plate-like member being long in the Y direction. The second flow channel substrate 34 is disposed on the surface Fa of the first flow channel substrate 32 on the negative side in the Z direction with, for example, an adhesive.

As shown in FIG. 2, in addition to the second flow channel substrate 34, a vibrating portion 42, multiple piezoelectric elements 44, a protection member 46, and a housing 48 are disposed on the surface Fa of the first flow channel substrate 32. On the other hand, on the positive side in the Z direction of first flow channel substrate 32, i.e., on the surface Fb opposite to the surface Fa, a nozzle plate 52 and a vibration absorber 54 are disposed. The elements of the ink jet head 3 are each schematically a plate-like member being long in the Y direction, as in the first flow channel substrate 32 and the second flow channel substrate 34, and are bonded to each other with, for example, an adhesive. It is also possible to comprehend that the direction in which the first flow channel substrate 32 and the second flow channel substrate 34 are stacked, the direction in which the first flow channel substrate 32 and the nozzle plate 52 are stacked, or the direction perpendicular to the surface of each plate-like element is the Z direction.

The nozzle plate 52 is a plate-like member provided with multiple nozzles N and is disposed on the surface Fb of the first flow channel substrate 32 with, for example, an adhesive. Each of the nozzles N is a circular through hole through which ink passes. In the nozzle plate 52 of a first embodiment, multiple nozzles N constituting a first line L1 and multiple nozzles N constituting a second line L2 are formed. Specifically, the multiple nozzles N of the first line L1 are formed along the Y direction in the region on the positive side in the X direction of the nozzle plate 52 when viewed from the central plane O, and the multiple nozzles N of the second line L2 are formed along the Y direction in the region on the negative side in the X direction. The nozzle plate 52 is a single plate-like member continuing over the portion in which the multiple nozzles N of the first line L1 are formed and the portion in which the multiple nozzles N of the second line L2 are formed. The nozzle plate 52 is manufactured by a semiconductor manufacturing technique, for example, by processing a single-crystal substrate of silicon by a processing technique, such as dry etching or wet etching. However, the nozzle plate 52 can be manufactured arbitrarily using known materials and manufacturing methods.

As shown in FIG. 2, in the first flow channel substrate 32, a space Ra, multiple supply channels 61, and multiple communication passages 63 are formed in each of the first portion P1 and the second portion P2. The space Ra is an opening formed so as to be long along the Y direction in planar view, i.e., when viewed from the Z direction, and the supply channels 61 and the communication passages 63 are through holes formed for each nozzle N. The multiple communication passages 63 are arranged in the Y direction in planar view, and the multiple supply channels 61 are arranged between the array of the communication passages 63 and the space Ra in the Y direction. The multiple supply channels 61 communicate in common with the space Ra. In addition, one arbitrary communication passage 63 overlaps a nozzle N corresponding to the communication passage 63 in planar view. Specifically, one arbitrary communication passage 63 in the first portion P1 communicates with one nozzle N in the first line L1 corresponding to the communication passage 63. Similarly, one arbitrary communication passage 63 in the second portion P2 communicates with one nozzle N in the second line L2 corresponding to the communication passage 63.

As shown in FIG. 2, the second flow channel substrate 34 is a plate-like member provided with multiple pressure chambers C in each of the first portion P1 and the second portion P2. The pressure chambers C are arranged in the Y direction. The pressure chambers C are each a space formed for each of the nozzles N and being long in the X direction in planar view. The first flow channel substrate 32 and the second flow channel substrate 34 are manufactured by, for example, processing a single-crystal substrate of silicon by a semiconductor manufacturing technique, as in the above-described nozzle plate 52. However, the first flow channel substrate 32 and the second flow channel substrate 34 can be manufactured arbitrarily using known materials and manufacturing methods. As exemplified above, the flow channel forming portion 30 and the nozzle plate 52 in the first embodiment encompass substrates made of silicon. Accordingly, for example, there is an advantage that minute flow channels can be formed with high precision in the flow channel forming portion 30 and the nozzle plate 52 by a semiconductor manufacturing technique as exemplified above.

As shown in FIG. 2, a vibrating portion 42 is disposed on the surface of the second flow channel substrate 34 opposite to the first flow channel substrate 32. The vibrating portion 42 of the first embodiment is a plate-like member that is capable of elastically vibrating. Incidentally, the second flow channel substrate 34 and the vibrating portion 42 can also be integrally formed by selectively removing a part of the plate-like member having a predetermined thickness in the thickness direction in the region corresponding to the pressure chamber C.

As shown in FIG. 2, the surface Fa of the first flow channel substrate 32 and the vibrating portion 42 face each other with an interval in the inside of each pressure chamber C. The pressure chamber C is a space located between the surface Fa of the first flow channel substrate 32 and the vibrating portion 42 and generates a change in the pressure of the ink filled in the space. The pressure chambers C are each a space whose longitudinal direction is, for example, the X direction, and are formed for each nozzle N. In each of the first line L1 and the second line L2, multiple pressure chambers C are arranged in the Y direction. As shown in FIG. 2, the end of one arbitrary pressure chamber C on the central plane O side overlaps the communication passage 63 in planar view, and the end on the opposite side to the central plane O overlaps the supply channel 61 in planar view. Accordingly, in each of the first portion P1 and the second portion P2, the pressure chamber C is communicated with the nozzle N through the communication passage 63 and is also communicated with the space Ra through the supply channel 61. Incidentally, it is also possible to add a predetermined flow channel resistance by forming a throttle flow channel having a narrowed flow channel width in the pressure chamber C.

As shown in FIG. 2, on the surface of the vibrating portion 42 on the opposite side to the pressure chamber C, multiple piezoelectric elements 44 corresponding to different nozzles N are disposed in each of the first portion P1 and the second portion P2. The piezoelectric elements 44 are passive elements that are deformed by supply of a driving signal. The multiple piezoelectric elements 44 are arranged in the Y direction so as to correspond to each pressure chamber C. One arbitrary piezoelectric element 44 is, for example, a laminate in which a piezoelectric layer intervenes between two electrodes facing each other. Incidentally, it is also possible to define the part deforming by supply of a driving signal, i.e., an active portion vibrating the vibrating portion 42 as the piezoelectric element 44. In the embodiment, when the vibrating portion 42 vibrates in conjunction with deformation of the piezoelectric elements 44, the pressure in the pressure chamber C varies. Consequently, the ink filling the pressure chamber C passes through the communication passage 63 and the nozzle N and is ejected.

The protection member 46 in FIG. 2 is a plate-like member for protecting the multiple piezoelectric elements 44 and is disposed on the surface of the vibrating portion 42 or the surface of the second flow channel substrate 34. Although the material and the manufacturing method for the protection member 46 are arbitrary, the protection member 46 can be formed by, for example, processing a single-crystal substrate of silicon by a semiconductor manufacturing technique as in the first flow channel substrate 32 and the second flow channel substrate 34. The multiple piezoelectric elements 44 can be accommodated in a recess formed on the surface of the protection member 46 on the vibrating portion 42 side.

An end of a wiring substrate 28 is bonded to the surface of the vibrating portion 42 on the opposite side to the flow channel forming portion 30 or the surface of the flow channel forming portion 30. The wiring substrate 28 is a flexible mounting part in which multiple wirings (not shown) electrically connecting a control unit 20 and an ink jet head 3 are formed. An end of the wiring substrate 28 passing through an opening formed in the protection member 46 and an opening formed in the housing 48 and extending to the outside is connected to the control unit 20. For example, a flexible printed circuit (FPC) or a flexible flat cable (FFC) is suitably used as the flexible wiring substrate 28.

The housing 48 is a case for storing ink that is supplied to the multiple pressure chambers C and further to the multiple nozzles N. The surface of the housing 48 on the positive side in the Z direction is bonded to the surface Fa of the first flow channel substrate 32 with, for example, an adhesive. In manufacturing of the housing 48, a known technique or a manufacturing method can be arbitrarily employed. For example, the housing 48 can be formed by injection molding of a resin material.

As shown in FIG. 2, a space Rb is formed in each of the first portion P1 and the second portion P2 of the housing 48. The space Rb of the housing 48 and the space Ra of the first flow channel substrate 32 are communicated with each other. The space constituted of the space Ra and the space Rb functions as a liquid storage chamber R for storing ink that is supplied to the multiple pressure chambers C. The liquid storage chamber R is a common liquid chamber that is used for the multiple nozzles N. The first portion P1 and the second portion P2 are each provided with the liquid storage chamber R. The liquid storage chamber R of the first portion P1 is located on the positive side in the X direction when viewed from the central plane O, and the liquid storage chamber R of the second portion P2 is located on the negative side in the X direction when viewed from the central plane O. An inlet port 482 for introducing the ink supplied from a liquid container 14 to the liquid storage chamber R is formed on the surface of the housing 48 on the opposite side to the first flow channel substrate 32.

A vibration absorber 54 is disposed on the surface Fb of the first flow channel substrate 32 in each of the first portion P1 and the second portion P2. The vibration absorber 54 is a flexible film absorbing a change in the pressure of the ink in the liquid storage chamber R, i.e., a compliance substrate. For example, the vibration absorber 54 is disposed on the surface Fb of the first flow channel substrate 32 so as to occlude the space Ra of the first flow channel substrate 32 and the multiple supply channels 61 to constitute a wall, specifically, the bottom of the liquid storage chamber R.

A space (hereinafter, referred to as "circulation liquid chamber") 65 is formed on the surface Fb of the first flow channel substrate 32 facing the nozzle plate 52. The circulation liquid chamber 65 of the first embodiment is a long bottomed hole extending in the Y direction in planar view. The opening of the circulation liquid chamber 65 is occluded by the nozzle plate 52 bonded to the surface Fb of the first flow channel substrate 32. The circulation liquid chamber 65 continues, for example, over the multiple nozzles N along the first line L1 and the second line L2. Specifically, the circulation liquid chamber 65 is formed between the arrangement of the multiple nozzles N of the first line L1 and the arrangement of the multiple nozzles N of the second line L2. Accordingly, the circulation liquid chamber 65 is located between the communication passages 63 of the first portion P1 and the communication passages 63 of the second portion P2. Thus, the flow channel forming portion 30 is a structure in which the pressure chambers C and the communication passages 63 in the first portion P1, the pressure chambers C and the communication passages 63 in the second portion P2, and the circulation liquid chamber 65 located between the communication passages 63 in the first portion P1 and the communication passages 63 in the second portion P2 are formed. As shown in FIG. 2, the flow channel forming portion 30 includes a wall-like portion (hereinafter, referred to as "partition wall") 69 that partitions between the circulation liquid chamber 65 and each communication passage 63.

Incidentally, as described above, multiple pressure chambers C and multiple piezoelectric elements 44 are arranged in the Y direction in each of the first portion P1 and the second portion P2. Accordingly, it is also possible to express that the circulation liquid chamber 65 extends in the Y direction to continue over the multiple pressure chambers C or the multiple piezoelectric elements 44 in each of the first portion P1 and the second portion P2. In addition, as shown in FIG. 2, the circulation liquid chambers 65 and the liquid storage chambers R extend in the Y direction with an interval therebetween, and it is also possible that the pressure chambers C, the communication passages 63, and the nozzles N are located in the interval.

FIG. 3 is a partial exploded cross-sectional view of the vicinity of a circulation liquid chamber 65 in the ink jet head 3. As shown in FIG. 3, one nozzle N in the embodiment includes a first section n1 and a second section n2. The first section n1 and the second section n2 are circular spaces coaxially formed and communicating with each other. The second section n2 is located on the flow channel forming portion 30 side when viewed from the first section n1. In the embodiment, the central axis Qa of each nozzle N is located on the opposite side to the circulation liquid chamber 65 when viewed from the central axis Qb of the communication passage 63. The inner diameter d2 of the second section n2 is larger than the inner diameter d1 of the first section n1. As described above, a structure in which the nozzles N are formed in a step like shape has an advantage that the flow channel resistance of each nozzle N can be easily set to desired characteristics. In the embodiment, the central axis Qa of each nozzle N is located on the opposite side to the circulation liquid chamber 65 when viewed from the central axis Qb of the communication passages 63.

As shown in FIG. 3, multiple exhaust passages 72 are formed on the surface of the nozzle plate 52 facing the flow channel forming portion 30 in each of the first portion P1 and the second portion P2. The multiple exhaust passages 72 of the first portion P1 correspond one-to-one to the multiple nozzles N of the first line L1 or to the multiple communication passages 63 corresponding to the first line L1. In addition, the exhaust passages 72 of the second portion P2 correspond one-to-one to the multiple nozzles N of the second line L2 or the multiple communication passages 63 corresponding to the second line L2.

Each of the exhaust passages 72 is a groove extending in the X direction, i.e., a long bottomed hole, and functions as a flow channel for ink. The exhaust passages 72 of the first embodiment are formed at a position separated from the nozzles N, specifically, on the circulation liquid chamber 65 side when viewed from the nozzles N corresponding to the exhaust passages 72. For example, the multiple nozzles N, especially, the second section n2, and the multiple exhaust passages 72 are collectively formed by a common process by a semiconductor manufacturing technique, for example, a processing technique, such as dry etching and wet etching.

Each of the exhaust passages 72 is linearly formed with a flow channel width Wa equivalent to the inner diameter d2 of the nozzle N in the second section n2. In addition, the flow channel width Wa of the exhaust passage 72 in the first embodiment is smaller than the flow channel width Wb of the pressure chamber C. Accordingly, it is possible to increase the flow channel resistance of the exhaust passage 72, compared to the configuration in which the flow channel width Wa of the exhaust passage 72 is larger than the flow channel width Wb of the pressure chamber C. On the other hand, the depth Da of the exhaust passage 72 from the surface of the nozzle plate 52 is constant over the whole length. Specifically, each exhaust passage 72 is formed with a depth equivalent to the depth of the second section n2 of the nozzle N. The configuration described above has an advantage that the exhaust passages 72 and the second section n2 are easily formed, compared to the configuration in which the exhaust passages 72 and the second section n2 are formed with different depths from each other. Incidentally, the "depth" of the flow channel means the depth of the flow channel in the Z direction, for example, the difference in height between the flow channel-forming surface and the bottom of the flow channel.

One arbitrary exhaust passage 72 in the first portion P1 is located on the circulation liquid chamber 65 side when viewed from the nozzle N corresponding to the exhaust passage 72 in the first line L1. In addition, one arbitrary exhaust passage 72 in the second portion P2 is located on the circulation liquid chamber 65 side when viewed from the nozzle N corresponding to the exhaust passage 72 in the second line L2. The side of each exhaust passage 72 opposite to the central plane O overlaps one communication passage 63 corresponding to the exhaust passage 72 in planar view. That is, the exhaust passages 72 are communicated with the communication passages 63. On the other hand, the end of each exhaust passage 72 on the central plane O side overlaps the circulation liquid chamber 65 in planar view. That is, the exhaust passages 72 are communicated with the circulation liquid chamber 65. Thus, the multiple communication passages 63 are each communicated with the circulation liquid chamber 65 through the exhaust passage 72. Accordingly, as indicated by the dashed line arrows in FIG. 3, the ink in each of the communication passages 63 is supplied to the circulation liquid chamber 65 through the exhaust passage 72. That is, in the embodiment, the multiple communication passages 63 corresponding to the first line L1 and the multiple communication passages 63 corresponding to the second line L2 are communicated in common with one circulation liquid chamber 65.

FIG. 3 shows the flow channel length La of the part of one arbitrary exhaust passage 72 overlapping the circulation liquid chamber 65, the flow channel length, i.e., the size Lb in the X direction, of the part of the exhaust passage 72 overlapping the communication passages 63, and the flow channel length, i.e., the size Lc in the X direction, of the part of the exhaust passage 72 overlapping the partition wall 69 of the flow channel forming portion 30. The flow channel length Lc corresponds to the thickness of the partition wall 69. The partition wall 69 functions as a throttle portion of the exhaust passage 72. Accordingly, the flow channel resistance of the exhaust passage 72 increases with the flow channel length Lc corresponding to the thickness of the partition wall 69. In the embodiment, a relationship that the flow channel length La is longer than the flow channel length Lb and that the flow channel length La is longer than the flow channel length Lc is established. Furthermore, in the embodiment, a relationship that the flow channel length Lb is longer than the flow channel length Lc is established. According to the configuration described above, there is an advantage that ink easily flows into the circulation liquid chamber 65 from the communication passage 63 through the exhaust passage 72, compared to a configuration in which the flow channel length La and the flow channel length Lb are shorter than the flow channel length Lc.

As described above, in the ink jet head 3, the pressure chamber C is indirectly communicated with the circulation liquid chamber 65 through the communication passage 63 and the exhaust passage 72. That is, the pressure chamber C and the circulation liquid chamber 65 are not directly communicated with each other. In the configuration described above, when the pressure in the pressure chamber C changes by the action of the piezoelectric element 44, a part of the ink flowing in the communication passage 63 is ejected from the nozzle N to the outside, and the remaining part of the ink flows into the circulation liquid chamber 65 from the communication passage 63 through the exhaust passage 72. The inertances of the communication passage 63, the nozzle, and the exhaust passage 72 are selected such that the ejection amount of the ink ejected through the nozzle N in the ink flowing in the communication passage 63 by one-time driving of the piezoelectric element 44 is larger than the circulating amount of the ink flowing in the circulation liquid chamber 65 through the exhaust passage 72 in the ink flowing in the communication passage 63. Assuming that all the piezoelectric elements 44 are driven at once, it is also possible to express that the sum of the circulating amounts flowing into the circulation liquid chamber 65 from the multiple communication passages 63, for example, the flow rate per unit time in the circulation liquid chamber 65, is larger than the sum of the injection amounts by the multiple nozzles N.

Specifically, the flow channel resistances of the communication passage 63, the nozzle, and the exhaust passage 72 are each determined such that the rate of the circulating amount of the ink based on the amount of the ink flowing in the communication passage 63 is 70% or more, that is, the rate of the ejection amount of the ink is 30% or less. According to the configuration described above, it is possible to effectively circulate the ink present in the vicinity of a nozzle in the circulation liquid chamber 65, while securing the ejection amount of the ink. Schematically, there is a tendency that the circulating amount decreases but the ejection amount increases with an increase in the flow channel resistance of the exhaust passage 72, in other words, the circulating amount increases but the ejection amount decreases with a decrease in the flow channel resistance of the exhaust passage 72.

For example, the printer 1 has a structure including a circulation mechanism (not shown). The circulation mechanism is a mechanism for supplying the ink in the circulation liquid chamber 65 to the liquid storage chamber R, i.e., circulating the ink. The circulation mechanism includes, for example, a suction mechanism for sucking the ink from the circulation liquid chamber 65, such as a pump, a filter mechanism (not shown) for collecting bubbles and foreign matter mixed in the ink, and a heating mechanism for heating the ink to reduce the thickening. The ink in which bubbles and foreign matter are removed and the thickening is reduced by the circulation mechanism is supplied to the liquid storage chamber R from the circulation mechanism through the inlet port 482. Consequently, the ink circulates in the path of liquid storage chamber R→supply channel 61→pressure chamber C→communication passage 63→exhaust passage 72→circulation liquid chamber 65→circulation mechanism→liquid storage chamber R. The supply channel 61 and the exhaust passage 72 are collectively referred to as a circulation passage.

Thus, when the exhaust passage 72 communicating between the communication passage 63 and the circulation liquid chamber 65 is formed in the nozzle plate 52, it is possible to efficiently circulate the ink present in the vicinity of the nozzle N in the circulation liquid chamber 65. In addition, since the communication passage 63 corresponding to the first line L1 and the communication passage 63 corresponding to the second line L2 are communicated in common with the circulation liquid chamber 65 between the both, there is also an advantage that the configuration of the liquid ejection head 26 is simplified, consequently, miniaturization is realized, compared to a configuration in which the circulation liquid chamber communicating with each of the exhaust passages 72 corresponding to the first line L1 and the circulation liquid chamber communicating with each of the exhaust passages 72 corresponding to the second line L2 are separately disposed.

In addition, the exhaust passage 72 and the nozzle N are not separated from each other and may be continuous with each other. Alternatively, in addition to the circulation liquid chamber 65, circulation liquid chambers corresponding to the first portion P1 and the second portion P2, respectively, may be formed.

In the embodiment, the printer 1 may include a drying means or a heating means (not shown). The drying means and the heating means are means for efficiently drying the process liquid or the ink adhered to fabric 2 in the ink jet recording method described below. The drying means and the heating means may be disposed at any position being capable of drying or heating the fabric 2. In order to efficiently dry the ink or the process liquid adhered to the fabric 2, for example, in an example shown in FIG. 1, the drying means and the heating means can be disposed at a position facing the ink jet head 3.

Examples of the drying means and the heating means include a print heater mechanism of bringing the fabric 2 into contact with a heat source for heating, a mechanism of irradiating the fabric 2 with, for example, infrared rays or microwaves that are electromagnetic waves having a maximum wavelength of about 2,450 MHz, and a dryer mechanism of blowing warm air to the fabric 2. Heating of the fabric 2 is performed before or when droplets discharged from the nozzles of the ink jet head 3 adhere to the fabric 2. Various conditions for heating, for example, timing of heating implementation, heating temperature, and heating time, are controlled by a controller.

The drying means and the heating means may be disposed on the downstream side in the transportation direction of the fabric 2. In such a case, an image is formed by adhesion of the ink and process liquid discharged from nozzles to fabric 2, and the fabric 2 is then heated. Consequently, the drying properties of the ink and the process liquid adhered to fabric 2 are improved.

As described above, in the liquid discharge apparatus according to the embodiment, the liquid discharge section has a configuration including a pressure chamber and a circulation passage for circulating the ink composition in the pressure chamber, and the ink in the pressure chamber and the nozzle is refreshed. Consequently, clogging due to aggregates of, for example, the resin particles in the ink is suppressed, and the discharge stability in the ink jet recording method described below can be improved.

2. PIGMENT TEXTILE PRINTING INK COMPOSITION

The pigment textile printing ink composition according to the embodiment is a pigment textile printing ink composition to be adhered to fabric by being discharged from a nozzle of a liquid discharge section including a pressure chamber and a circulation passage for circulating the ink composition in the pressure chamber and is characterized by the pigment textile printing ink composition contains resin particles, water, and an organic solvent; the resin particles have a glass transition temperature of 5° C. or less and are contained in an amount of 6.5 mass % or more based on the total amount of the pigment textile printing ink composition; and as the organic solvent, a polyhydric alcohol having a boiling point of 270° C. or more is contained in an amount of 15.0 mass % or less based on the total amount of the ink composition.

In the present specification, the pigment textile printing ink composition may be an aqueous ink composition. Here, the term "aqueous ink composition" refers to an ink composition in which the content of water is 30 mass % or more based on the total amount of the ink composition.

The pigment textile printing ink composition (hereinafter, also simply referred to as "ink composition" or "ink") to be used in the embodiment will now be described.

2.1. Pigment

Pigments can simplify the processes, such as the dyeing process and the washing process, compared to dyes and have excellent color development properties and abrasion resistance and are therefore used as color materials.

As the pigment, any of known organic pigments and inorganic pigments can be used. Examples of the organic pigment include azo pigments, such as azo lake pigments, insoluble azo pigments, condensed azo pigments, and chelate azo pigments; polycyclic pigments, such as phthalocyanine pigments, perylene pigments, perinone pigments, anthraquinone pigments, quinacridone pigments, dioxazine pigments, thioindigo pigments, isoindolinone pigments, isoindoline pigments, quinophthalone pigments, and diketopyrrolopyrrole pigments; dye lake pigments, such as basic dye lakes and acid dye lakes; and nitro pigments, nitroso pigments, aniline blacks, and daylight fluorescent pigments. Examples of the inorganic pigment include metal oxide pigments, such as titanium dioxide, zinc oxide, and chromium oxide; and carbon blacks. Alternatively, glitter pigments, such as pearl pigments and metallic pigments, may be used.

For example, examples of the black pigment for a black ink composition include C.I. Pigment Blacks 1, 7, and 11. C.I. means "Color Index Generic Name". As the black pigment for an ink jet textile printing, in particular, C.I. Pigment Black 7, which is a carbon black having a relatively low specific gravity and being less likely to precipitate in aqueous media, may be used.

Examples of the pigment for compositions other than the black ink composition include C.I. Pigment Yellows 1, 3, 12, 13, 14, 17, 24, 34, 35, 37, 42, 53, 55, 74, 81, 83, 95, 97, 98, 100, 101, 104, 108, 109, 110, 117, 120, 138, 153, 155, and 180; C.I. Pigment Reds 1, 2, 3, 5, 17, 22, 23, 31, 38, 48:2 (permanent red 2B (Ba)), 48:2 (permanent red 2B (Ca)), 48:3, 48:4, 49:1, 52:2, 53:1, 57:1, 60:1, 63:1, 63:2, 64:1, 81, 83, 88, 101, 104, 105, 106, 108, 112, 114, 122, 123, 146, 149, 166, 168, 170, 172, 177, 178, 179, 185, 190, 193, 209, and 219; C.I. Pigment Violets 19 and 23; C.I. Pigment Blues 1, 2, 15, 15:1, 15:2, 15:3, 15:4, 15:6, 16, 17:1, 56, 60, and 63; and C.I. Pigment Greens 1, 4, 7, 8, 10, 17, 18, and 36.

The above-mentioned pigments may be used alone or in combination of two or more thereof. The pigment may have an average particle diameter of 5 μm or less or 0.3 μm or less and may be 0.01 μm or more and 0.15 μm or less. When the average particle diameter of the pigment is within such a range, the stability of discharge from the ink jet head can be secured, and the color development properties of the pigment in printed matter can be improved.

In addition, in the embodiment, examples of the white pigment for a white ink composition include C.I. Pigment White 1 which is basic lead carbonate, C.I. Pigment White 4 which is composed of zinc oxide, C.I. Pigment White 5 which is composed of a mixture of zinc sulfide and barium sulfate, C.I. Pigment White 6 which is composed of titanium dioxide, C.I. Pigment White 6:1 which is composed of titanium dioxide and containing another metal oxide, C.I. Pigment White 7 which is composed of zinc sulfide, C.I. Pigment White 18 which is composed of calcium carbonate, C.I. Pigment White 19 which is composed of clay, C.I. Pigment White 20 which is composed of mica titanium, C.I. Pigment White 21 which is composed of barium sulfate, C.I. Pigment White 22 which is composed of gypsum, C.I. Pigment White 26 which is composed of magnesium oxide/silicon dioxide, C.I. Pigment White 27 which is composed of silicon dioxide, and C.I. Pigment White 28 which is composed of anhydrous calcium silicate. Among these pigments, C.I. Pigment White 6 which has, for example, excellent color development properties and latency may be used.

The white pigment may have an average particle diameter of 100 µm or more and 500 µm or less, 50 µm or more and 450 µm or less, or 200 µm or more and 400 µm or less. When the average particle diameter of the white pigment is within this range, the stability of discharge from the ink jet head can be secured. In addition, the concealability to the previously dyed color on fabric cloth is improved.

Incidentally, in the present specification, the "average particle diameter" means volume-based particle size distribution which is a particle diameter when the cumulative distribution is 50 vol % unless otherwise specified. The average particle diameter is measured by a dynamic light scattering method or a laser diffraction light scattering method described in JIS 28825. Specifically, a particle size analyzer (for example, "Microtrac UPA" manufactured by Nikkiso Co., Ltd.) using the dynamic light scattering method as the measurement principle can be employed.

In the embodiment, the lower limit of the content of the pigment contained in the pigment textile printing ink composition varies depending on the type of the pigment used but may be 1 mass % or more, 3 mass % or more, or 4 mass % or more based on the total amount, i.e., 100 mass %, of the ink from the viewpoint of, for example, securing good color development properties. In addition, the upper limit of the content of the pigment may be 30 mass % or less, 15 mass % or less, or 12 mass % or less for securing the stability of discharge from the ink jet head.

The above-mentioned pigments may be used alone or in combination of two or more thereof. In order to enhance the dispersibility of the pigment in the ink composition, the pigment may be surface-treated, or the ink composition may contain, for example, a dispersant. The surface treatment of the pigment is a method for introducing a hydrophilic group, such as a carboxy group or a sulfo group, to the particle surface of the pigment by physical treatment or chemical treatment. The pigment can be dispersed in an aqueous medium, such as water, by surface treatment of the pigment.

The dispersant to be used in the aqueous medium has a function that the hydrophobic group, which is the hydrophobic moiety in the molecular structure, is adsorbed to the particle surface of the pigment and the hydrophilic group, which is the hydrophilic moiety, is oriented to the medium side. The pigment can be dispersed in an aqueous medium by this function. As the dispersant, a known surfactant or a polymer compound can be used. Alternatively, a method for adding dispersibility by covering pigment particles with, for example, a polymer compound may be used. As the method for covering pigment particles, for example, an acid precipitation method, a phase inversion emulsification method, or a miniemulsion polymerization method can be employed.

2.2. Resin Particles

The pigment textile printing ink composition according to the embodiment contains resin particles. The resin particles form a resin coating film by heating after recording to improve the fixity of the image formed by the ink composition. Consequently, the washing fastness and the friction fastness of the resulting image can be improved, and the image can have excellent abrasion resistance. The resin particles may be used in an emulsion form from the viewpoint of suppressing an increase in the viscosity of the ink.

In the embodiment, the ink composition is used for recording on fabric. Here, since the fabric is highly elastic, the recorded image, i.e, the ink film formed by the ink, may also be required to be elastic or to be easily stretched. That is, when the ink film has an elongation to follow the elasticity of the fabric, the ink film can be prevented from being broken or cracked, the washing factness and friction fastness are secured, and an image with excellent abrasion resistance can be obtained.

Accordingly, the resin particles contained in the pigment textile printing ink composition according to the embodiment have a glass transition temperature (Tg) of 5° C. or less. The texture of printed matter is improved by using such resin particles, the ink film is prevented from being broken and cracked, and washing and friction fastness can be secured. The glass transition temperature (Tg) may be 0° C. or less or −10° C. or less. The lower limit of the glass transition temperature may be −25° C. or more. In particular, when the glass transition temperature is 5° C. or less, since the minimum film forming temperature is decreased, the resin readily forms a film, and the texture of the printed matter can be improved. In addition, when the glass transition temperature (Tg) is −25° C. or more, the strength of the resulting film can be readily maintained.

In addition, when the glass transition temperature is 5° C. or less, aggregates are readily generated in the ink, clogging occurs in the nozzle during recording, and the discharge stability is likely to decrease. However, in recording using the pigment textile printing ink composition according to the embodiment, the ink in the pressure chamber and the nozzle is refreshed by using the above-described liquid discharge apparatus including a pressure chamber and a circulation passage for circulating the ink composition in the pressure chamber, clogging by aggregates of the resin particles is suppressed, and the discharge stability can be improved.

The resin particles contained in the pigment textile printing ink composition according to the embodiment may have a film elongation of 400% or more, 450% or more, or 500% or more and may have a film elongation of 750% or less, 700% or less, or 600% or less. When the film elongation of the resin is within the above-mentioned range, in particular, when the film elongation is not lower than the lower limit, an image well following the elasticity of fabric can be formed. In addition, when the film elongation of the resin is within the above-mentioned range, in particular, when the film elongation is not higher than the upper limit, the plasticity of the ink film is kept within an appropriate range, and a decrease in the anchor effect on fabric can be suppressed. Consequently, an image having excellent abrasion resistance can be formed while suppressing a decrease in the fixity of the pigment. For similar reasons, the resin may have a film strength of 40 MPa or more or 50 MPa or more.

The film elongation and the film strength of a resin are measured as follows. A resin is applied onto a polytetrafluoroethylene sheet such that the film thickness after drying is 500 µm and is dried under ordinary temperature and ordinary pressure, i.e., at 20° C. and 65% RH for 15 hours, further at 80° C. for 6 hours, and at 120° C. for 20 minutes, and the resin is then peeled from the sheet to produce a resin film. The film elongation of the resulting resin film is measured using a tensile tester at a measurement temperature of 20° C. and a measurement speed of 200 mm/min. In the measurement of the film elongation, the resin film is elongated, the length elongated until the resin film is broken is measured, and its rate is expressed in percent as the film elongation. The film strength is determined by measuring the tensile strength at the time of being broken. Incidentally, as the tensile tester, for example, "Tensilon Universal Testing Instrument RTC-1225A" (trade name) manufactured by Orientec Corporation or an equivalent thereof can be used.

As such a resin of the resin particles, for example, acrylic resins, styrene acrylic resins, fluorene resins, urethane resins, polyolefin resins, rosin modified resins, terpene resins, polyester resins, polyamide resins, epoxy resins, vinyl chloride resins, vinyl chloride-vinyl acetate copolymers, and ethylene vinyl acetate resins can be used. These resins may be used alone or in combination of two or more thereof. Among these resins, at least one selected from urethane resins and acrylic resins, in particular, a urethane resin, may be used because they have a high freedom in design and therefore easily provide desired film physical properties, i.e., the glass transition temperature and the film elongation.

The urethane resin may be any resin having a urethane skeleton and being water dispersible, and commercially available one, for example, SUPERFLEX 460, 460s, 470, 650, or 840 manufactured by DKS Co., Ltd., Rezamine D-1060, D-2020, D-4080, D-4200, D-6300, or D-6455 manufactured by Dainichiseika Color & Chemicals Mfg. Co., Ltd., TAKELAC W-6110, WS-6021, or W-512-A-6 manufactured by Mitsui Chemicals & SKC Polyurethanes Inc., Sancure 2710 manufactured by The Lubrizol Corporation, or Bontighter HUX-380 manufactured by ADEKA Corporation may be used.

In addition, as the urethane resin, in addition to a urethane bond, a polyether urethane resin having an ether bond in the main chain, a polyester urethane resin having an ester bond in the main chain, a polycarbonate urethane resin having a carbonate bond in the main chain, or the like can be used. These urethane resins may be used in combination of two or more thereof. A polycarbonate urethane resin may be used from the viewpoint of improving the friction fastness.

As the acrylic resin, for example, a polymer of acrylic acid or an acrylic monomer, such as an acrylic ester, or a copolymer of an acrylic monomer and another monomer can be used. Examples of another monomer include vinyl monomers, such as styrene. The acrylic resin may be a commercially available one, and examples thereof include Movinyl series 702, 7502, 7525, and 7320 manufactured by Nippon Synthetic Chemical Industry Co., Ltd. and VINYBLAN 2682 manufactured by Nissin Chemical Co., Ltd.

In the embodiment, the content of the resin particles is 6.5 mass % or more in terms of solid content based on the total amount of the ink and may be 8.0 mass % or more. The upper limit of the content of the resin particles may be 20.0 mass % or less, 15.0 mass % or less, or 12.0 mass % or less. When the content of the resin particles is within the above-mentioned range, printed matter having excellent abrasion resistance can be obtained.

At the same time, if the content of the resin particles is within the above-mentioned range, aggregates are readily generated in the ink, clogging occurs in the nozzle during recording, and the discharge stability is likely to decrease. However, in recording using the pigment textile printing ink composition according to the embodiment, the ink in the pressure chamber and the nozzle is refreshed by using the above-described liquid discharge apparatus including a pressure chamber and a circulation passage for circulating the ink composition in the pressure chamber, clogging by aggregates of the resin particles is suppressed, and the discharge stability can be improved.

In the ink jet recording method according to the embodiment described below, when process liquid is used, the above-mentioned resin particles may be contained in the process liquid. In such a case, the resin particles contained in the process liquid and the resin particles contained in the ink composition may be the same or different.

2.3. Water

As described above, in the embodiment, the ink composition is an aqueous pigment ink composition containing water. When the ink composition is applied to fabric, water evaporates and scatters from the fabric by drying. The water to be used may be pure water, such as deionized water, ultrafiltration water, reverse osmosis water, and distilled water, or ultrapure water. In particular, water obtained by sterilizing the above-mentioned water by, for example, ultraviolet irradiation or hydrogen peroxide addition may be used from the viewpoint of preventing the generation of mold and bacteria over a long period of time.

Although the content of water in the ink composition is not particularly limited, the content may be 40.0 mass % or more and 90.0 mass % or less, 50.0 mass % or more and 80.0 mass % or less, or 55.0 mass % or more and 70.0 mass % or less.

2.4. Organic Solvent

In the embodiment, the ink composition contains an organic solvent. As the organic solvent, the ink composition contains a polyhydric alcohol having a boiling point of 270° C. or more in an amount of 15.0 mass % or less based on the total amount of the ink composition. In the embodiment, the ink composition can control the physical properties, such as viscosity and surface tension, and the behaviors, such as drying and permeation, when applied to fabric by containing the organic solvent. Consequently, the discharge stability is improved, and the ink well spreads on fabric. In addition, when the ink composition contains a polyhydric alcohol having a boiling point of 270° C. or more as the organic solvent in an amount 15.0 mass % or less based on the total amount of the ink composition, the drying properties in the nozzle can be suppressed. Incidentally, in the embodiment, the boiling point is that in 1 atm environment.

In the embodiment, examples of the polyhydric alcohol include ethylene glycol, diethylene glycol, triethylene glycol, propylene glycol, dipropylene glycol, 1,3-propanediol, 1,3-butanediol, 1,3-pentanediol, 1,4-butanediol, 1,5-pentanediol, 1,6-hexanediol, 2,3-butanediol, 3-methyl-1,3-butanediol, 3-methyl-1,5-pentanediol, 2-methyl-1,3-propanediol, 2,2-dimethyl-1,3-propanediol, 2-methyl-2,4-pentanediol, and glycerol. Incidentally, polyhydric alcohols that are solids at 20° C. also have a function similar to that of the polyhydric alcohols functioning as the organic solvent and may be similarly used. Examples of the polyhydric alcohols that are solid at 20° C. include trimethylolpropane. The ink composition containing a polyhydric alcohol can suppress drying and solidification of the ink composition in the nozzles of the ink jet head and can reduce nozzle clogging, discharge defect, and so on.

The content of the polyhydric alcohol in the ink composition may be 10.0 mass % or more, 13.0 mass % or more, or 15.0 mass % or more based on the total amount of the ink composition. In addition, the content of the polyhydric alcohol in the ink composition may be 55.0 mass % or less, 50.0 mass % or less, or 45.0 mass % or less.

In addition, in the ink composition of the embodiment, the content of the polyhydric alcohol having a high boiling point of 270° C. or more is 15.0 mass % or less and may be 10.0 mass % or less, 6.0 mass % or less, or 5.5 mass % or less. In addition, the content of the polyhydric alcohol having a high boiling point of 270° C. or more may be 1.0 mass % or more, 3.0 mass % or more, or 5.0 mass % or more. Also when the content of the polyhydric alcohol having a high boiling point of 270° C. or more is within the above-mentioned range, nozzle clogging, discharge defect, and so on are reduced, the drying properties of ink are improved, and the abrasion resistance of the image is enhanced.

As described above, when a large amount of resin particles are contained and the glass transition temperature is low, aggregates are readily generated, clogging occurs in the nozzle during recording, and the discharge stability is likely to decrease. Accordingly, in general, a large amount of a polyhydric alcohol having a high boiling point, such as glycerol, is added to an ink composition. In the embodiment, drying of the ink composition or generation of aggregates in the vicinity of a nozzle can be suppressed by using the above-described liquid discharge apparatus including a pressure chamber and a circulation passage for circulating the ink composition in the pressure chamber. Consequently, it is not necessary to increase the content of the polyhydric alcohol having a high boiling point of 270° C. or more as a moisturizing component, and the content can be decreased to the above-mentioned level. Since drying of the ink composition or generation of aggregates in the vicinity of a nozzle can be sufficiently suppressed with such a low content, the content of the moisturizing component having a high boiling point can be decreased, and as a result, the drying properties of recorded matter are improved, and the abrasion resistance of the image is enhanced. In addition, the drying temperature can be reduced.

Consequently, in the embodiment, the content of the polyhydric alcohol having a boiling point of 270° C. or more may be 50.0 mass % or less, 40.0 mass % or less, or 30.0 mass % or less based on the total amount of the polyhydric alcohol. Even if the content is within such a range, when the above-described liquid discharge apparatus including a pressure chamber and a circulation passage for circulating the ink composition in the pressure chamber is used, the ink in the pressure chamber and the nozzle is refreshed, clogging due to aggregates of the resin particles is suppressed, and the discharge stability can be improved.

Furthermore, in the embodiment, the content mass ratio of the polyhydric alcohol having a boiling point of 270° C. or more to the solid content of the resin particles may be 2.5 or less, 1.5 or less, or 0.9 or less. Even if the mass ratio is within such a range, when the above-described liquid discharge apparatus including a pressure chamber and a circulation passage for circulating the ink composition in the pressure chamber is used, the ink in the pressure chamber and the nozzle is refreshed, clogging due to aggregates of the resin particles is suppressed, and the discharge stability can be improved.

In the embodiment, examples of the organic solvent other than the polyhydric alcohol include 2-pyrrolidones, 1,2-alkanediols, and glycol ethers.

The 2-pyrrolidones are compounds having a 2-pyrrolidone skeleton. Examples of the 2-pyrrolidones include compounds having substituents, such as N-methyl-2-pyrrolidone, N-ethyl-2-pyrrolidone, and N-vinyl-2-pyrrolidone, in addition to 2-pyrrolidone not having a substituent. The substituent on the 2-pyrrolidone skeleton may be an organic group, such as saturated or unsaturated hydrocarbon groups having 1 to 5 carbon atoms. Among these compounds, 2-pyrrolidone, which shows excellent storage stability of the ink composition and has an excellent effect of suppressing generation of aggregates, may be used.

Examples of the 1,2-alkanediols include 1,2-propanediol, 1,2-butanediol, 1,2-pentanediol, 1,2-hexanediol, and 1,2-octanediol. The 1,2-alkanediols have an excellent function of enhancing the wettability of the ink composition to fabric to evenly wet the fabric. Accordingly, it is possible to form images with reduced blur. The content of the 1,2-alkanediols may be 1.0 mass % or more and 20.0 mass % or less based on the total amount of the ink composition.

Examples of the glycol ethers include alkylene glycol monoethers and alkylene glycol diethers.

Examples of the alkylene glycol monoether include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, and dipropylene glycol monoethyl ether.

Examples of the alkylene glycol diether include ethylene glycol dimethyl ether, ethylene glycol diethyl ether, ethylene glycol dibutyl ether, diethylene glycol dimethyl ether, diethylene glycol diethyl ether, diethylene glycol methyl ethyl ether, diethylene glycol dibutyl ether, diethylene glycol butyl methyl ether, triethylene glycol dimethyl ether, triethylene glycol diethyl ether, triethylene glycol dibutyl ether, triethylene glycol butyl methyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

The wettability to fabric and the permeation rate can be controlled by adding glycol ethers to the ink composition. The content of the glycol ethers may be 0.05 mass % or more and 6.0 mass % or less based on the total amount of the ink composition.

2.5. Crosslinking Agent

In the embodiment, the ink composition may contain a crosslinking agent. When the ink composition or the resin particles contain a crosslinking agent, the crosslinking reaction between crosslinking agent molecules, the crosslinking reaction with the resin particles contained in the ink composition, and the crosslinking reaction with a reactive site, such as a hydroxy group, in fabric progress, and the friction fastness and adhesion of recorded matter are improved.

Examples of the crosslinking agent include a compound having a plurality of glycidyl ethers, a compound having a plurality of oxazoline groups, and a compound having a plurality of terminal-blocked isocyanate groups. Examples of the compound having glycidyl ethers include epoxy resins having glycidyl ethers as the skeletons, examples of the compound having oxazoline groups include resins having oxazoline groups, and examples of the compound having terminal-blocked isocyanate groups include urethane resins having terminal-blocked isocyanate groups.

When the crosslinking agents are contained, the total content thereof can be, for example, 0.1 mass % or more and 3.0 mass % or less based on the total amount of the ink composition.

When the ink composition contains a crosslinking agent, the crosslinking reaction in the ink progresses with time, and aggregates may be generated to deteriorate the discharge stability. Even in such a case, in the embodiment, the above-described liquid discharge apparatus including a pressure chamber and a circulation passage for circulating the ink composition in the pressure chamber is used, and the ink in the pressure chamber and the nozzle is refreshed. Consequently, even if the ink composition contains a crosslinking agent, the discharge stability is likely to be secured.

2.6. Surfactant

In the embodiment, the ink composition may include a surfactant. The surfactant can be used as a wetting agent that reduces the surface tension of the ink composition to control the wettability to fabric, i.e., the permeability to fabric. In addition, when the ink composition contains a surfactant, the stability of discharge from the ink jet head is secured, and the ink composition readily comes into contact with the component of the process liquid adhered to the fabric.

The surfactant may be any of nonionic surfactants, anionic surfactants, cationic surfactants, and amphoteric surfactants and may be a combination thereof. Among these surfactants, an acetylene glycol surfactant, a silicone surfactant, or a fluorosurfactant may be used.

Examples of the acetylene glycol surfactant include, but not limited to, SURFYNOL (registered trademark) series 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (trade names, manufactured by Nissin Chemical Co., Ltd.), OLFINE (registered trademark) series B, Y, P, A, STG, SPC, E1004, E1010, PD-001, PD-002W, PD-003, PD-004, PD-005, EXP.4001, EXP.4300, EXP.4036, EXP.4051, AF-103, AF-104, AK-02, SK-14, and AE-3 (trade names, manufactured by Nissin Chemical Co., Ltd.), and ACETYLENOL (registered trademark) series E00, E00P, E40, and E100 (trade names, manufactured by Kawaken Fine Chemicals Co., Ltd.).

The silicone surfactant is not particularly limited and may be a polysiloxane compound. The polysiloxane compound is not particularly limited and may be, for example, a polyether modified organosiloxane. Commercially available examples of the polyether modified organosiloxane include BYK (registered trademark)-306, BYK-307, BYK-333, BYK-341, BYK-345, BYK-346, and BYK-348 (trade names, manufactured by BYK Chemie GmbH), and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names, manufactured by Shin-Etsu Chemical Co., Ltd.).

The fluorosurfactant may be a fluorine modified polymer, and examples thereof include, but not limited to, BYK (registered trademark)-340 (trade name, manufactured by BYK-Chemie Japan K.K.).

When the ink composition contains a surfactant, two or more of the above-mentioned surfactants can be used, and the total content thereof may be 0.01 mass % or more and 3 mass % or less, 0.05 mass % or more and 2 mass % or less, 0.1 mass % or more and 1.5 mass % or less, or 0.2 mass % or more and 1 mass % or less based on the total amount of the ink.

2.7. Other Additives 2.7.1. Wax

In the embodiment, the ink composition may contain a wax. When the ink composition contains a wax, the abrasion resistance of the resulting image is improved, and the texture of fabric can be maintained.

Examples of the wax include plant and animal waxes, such as carnauba wax, Candelilla wax, beeswax, rice wax, and lanolin; mineral waxes, such as montan wax and ozokerite; paraffin wax, i.e., petroleum wax; synthetic waxes, such as carbon wax, Hoechst wax, polyolefin wax, silicone wax, and stearic acid amide wax; natural/synthetic wax emulsions, such as α-olefin/maleic anhydride copolymers; and blended wax. These waxes may be used alone or as a mixture of two or more thereof. In particular, for example, silicone was, polyolefin wax, or paraffin wax may be used.

When waxes are contained, the total content thereof can be, for example, 0.01 mass % or more and 2.0 mass % or less based on the total amount of the ink composition.

2.7.2. Chelating Agent

In the embodiment, the ink composition may contain an appropriate amount of a chelating agent for removing unnecessary ions in the ink. Examples of the chelating agent include ethylenediaminetetraacetic acids and salts thereof, such as sodium dihydrogen ethylenediaminetetraacetate or nitrilotriacetates, hexametaphosphates, pyrophosphates, or metaphosphates of ethylenediamine. When the ink composition contains a chelating agent, the content of the chelating agent can be 0.01 mass % or more and 1 mass % or less based on the total amount of the ink.

2.7.3. pH Adjuster

In the embodiment, the ink composition may contain a pH adjuster in order to adjust the pH. The pH adjuster is not particularly limited, and examples thereof include acids, bases, weak acids, and weak bases, and appropriate combinations thereof, specifically, tertiary alkanolamines, such as triethanolamine and triisopropanolamine. When a pH adjuster is contained, for example, the content thereof may be 0.01 mass % or more and 2 mass % or less, 0.1 mass % or more and 1 mass % or less, or 0.2 mass % or more and 0.5 mass % or less based on the total amount of the ink composition.

2.7.4. Preservative and Fungicide

In the embodiment, the ink composition may appropriately contain a preservative and a fungicide. Examples of the preservative and the fungicide include sodium benzoate, sodium pentachlorophenol, sodium 2-pyridinethiol-1-oxide, sodium sorbate, sodium dehydroacetate, 1,2-dibenzoisothiazolin-3-one such as PROXEL series CRL, BDN, GXL, XL-2, TN, and LV available from Lonza Japan Ltd., and 4-chloro-3-methylphenol such as PREVENTOL (registered trademark) CMK available from Bayer Holding Ltd.

2.7.5. Others

The ink composition may further contain, in addition to the components above, for example, additives that can usually be used in ink jet ink, for example, a rust preventive such as benzotriazole, an antioxidant, a UV absorber, an oxygen absorber, and a dissolution aid.

2.8. Method for Preparing Ink Composition

In the embodiment, the ink composition is prepared by mixing each component described above in an arbitrary order and removing impurities by, for example, filtration as necessary. As the method for mixing each component, a method in which materials are successively added to a container equipped with a stirrer, such as a mechanical stirrer or a magnetic stirrer, and are stirred and mixed is appropriately used. As the filtration, for example, centrifugal filtration or filter filtration can be performed as necessary.

2.9. Physical Properties of Ink Composition 2.9.1. Surface Tension

In the embodiment, the ink composition may have a surface tension at 20° C. of 20 mN/m or more and 40 mN/m or less or 30 mN/m or more and 36 mN/m or less from the viewpoint of the balance between the textile printing quality and reliability as ink jet ink. When the surface tension is within the range above, in ink jet textile printing, the discharge stability is excellent, and the ink readily uniformly wets fabric and spreads on the fabric at the time when the ink adheres to the fabric and easily permeates. Consequently, the ink readily fixes to the fabric.

The surface tension can be measured using, for example, an automatic surface tension meter CBVP-Z (trade name, manufactured by Kyowa Interface Science Co., Ltd.) by checking the surface tension when a platinum plate is wetted with ink under an environment of 20° C. In one example of the method for adjusting the surface tension within the above-mentioned range, the types of the organic solvent and the surfactant described above and the contents thereof and water are appropriately adjusted.

2.9.2. Viscosity

The viscosity at 20° C. of the ink may be 1.5 mPa·s or more and 12 mPa·s or less or 2 mPa·s or more and 10 mPa·s or less. When the viscosity at 20° C. of the ink is within the above-mentioned range, the ink adhered to fabric is further easily fixed, and the color development properties are improved.

The viscosity can be measured by, for example, using a viscoelasticity measuring apparatus MCR-series (trade name, manufactured by Anton Paar GmbH). In one example of the method for adjusting the viscosity within the above-mentioned range, the types of the organic solvent and the surfactant described above and the contents thereof and water are appropriately adjusted.

If the ink composition has a high viscosity, even a small change in the composition due to, for example, volatilization of a solvent contained in a minute amount causes a large increase in the viscosity, resulting in a difficulty in securing discharge stability. However, in the embodiment, since the above-described liquid discharge apparatus including a pressure chamber and a circulation passage for circulating the ink composition in the pressure chamber is used for recording, the ink in the nozzle is refreshed, and a change in the composition in the visinity of the nozzle is suppressed. Consequentially, even if the viscosity is high, the discharge stability of the ink can be readily secured. In addition, as described above, since the content of the moisturizing component can be decreased and the discharge stability can be secured even at a high viscosity, the amounts of the fixing resin and the pigment can be increased, and the ink can have further excellent color development properties and abrasion resistance.

2.9.3. Film Elongation and Strength of Ink Composition

The film elongation of the pigment textile printing ink composition according to the embodiment may be 400% or more, 450% or more, or 500% or more. In addition, the film elongation of the ink composition may be 750% or less, 700% or less, or 600% or less. When the film elongation of the ink composition is within the above-mentioned range, in particular, when the film elongation is not lower than the lower limit, an image well following the elasticity of fabric can be formed. In addition, when the film elongation of the ink composition is within the above-mentioned range, in particular, when the film elongation is not higher than the upper limit, the plasticity of the ink film is kept within an appropriate range, and a decrease in the anchor effect on fabric can be suppressed. Consequently, an image having excellent abrasion resistance can be formed while suppressing a decrease in the fixity of the pigment. For similar reasons, the ink composition may have a film strength of 40 MPa or more or 50 MPa or more.

The film elongation and the film strength of an ink composition can be measured as in the film elongation and the film strength of a resin described above.

3. FABRIC

The ink jet recording method according to the embodiment described below is performed to fabric. The material constituting the fabric is not particularly limited, and examples thereof include natural fibers, such as cotton, hemp, wool, and silk; synthetic fibers, such as polypropylene, polyester, acetate, triacetate, polyamide, and polyurethane; and biodegradable fibers, such as polylactic acid. The fabric may be blended fibers thereof.

The fabric may be any of the above-mentioned fibers formed into, for example, any of woven fabric, knitted fabric, and nonwoven fabric. In addition, the weight per unit area of the fabric that is used in the embodiment is also not particularly limited and may be 1.0 oz or more and 10.0 oz or less, 2.0 oz or more and 9.0 oz or less, 3.0 oz or more and 8.0 oz or less, or 4.0 oz or more and 7.0 oz or less. When the weight per unit area of the fabric is within such a range, satisfactory recording can be performed. Furthermore, the ink jet recording method according to the embodiment can be applied to multiple types of fabric having different weights per unit area, and satisfactory printing can be performed.

In the embodiment, examples of the form of the fabric include cloth, garments, and other clothing ornaments. The cloth includes, for example, woven fabric, knitted fabric, and nonwoven fabric. The garments and other clothing ornaments include sewn T-shirts, handkerchiefs, scarves, towels, carrier bags; cloth bags, curtains, sheets, and bedspreads; furniture such as wallpaper; and cut or uncut cloth as parts before sewing. Examples of these forms of fabric include a long one wound in a roll shape, one cut into a predetermined size, and one having a product shape. The fabric may be one to which a process liquid is applied in advance.

The weight per unit area of the fabric may be 1.0 oz or more and 10.0 oz or less, 2.0 oz or more and 9.0 oz or less, 3.0 oz or more and 8.0 oz or less, or 4.0 oz or more and 7.0 oz or less.

As the fabric, cotton fabric colored in advance with a dye may be used. Examples of the dye with which fabric is dyed in advance include water-soluble dyes, such as acid dyes and basic dyes; disperse dyes combined with dispersants; and reactive dyes. When cotton fabric is used, a reactive dye suitable for dyeing cotton may be used.

In addition, in the embodiment, the fabric may be treated with a process liquid composition (hereinafter, also simply referred to as "process liquid"). The process liquid composition is used by previously adhering to fabric as a base material of printed matter in ink jet textile printing and contains, for example, a cationic compound and the above-described water and organic solvent.

The cationic compound has a function of aggregating the components in the ink composition. Accordingly, when the ink composition adheres to the fabric to which the process liquid adhered, the cationic compound enhances aggregation of the ink particles or increases the viscosity of the ink to suppress absorption into apertures or inside of the fibers constituting the fabric. Thus, since the cationic compound retains the ink on the surface of fabric, the color development properties of the ink in the printed matter are improved. In addition, blur and bleeding are suppressed.

Examples of the cationic compound include multivalent metal salts, such as calcium salts and magnesium salts; cationic resins, such as cationic urethane resins, olefin resins, and allylamine resins; catinoic surfactants; and inorganic and organic acids. Among these compounds, multivalent metal salts may be used from the viewpoint of improving the color development properties of the pigment and being suitable for cotton fabric. These cationic compounds may be used alone or in combination of two or more thereof.

The content of the cationic compound contained in the process liquid is not particularly limited and may be 0.1 mass % or more, 2.0 mass % or more, or 5.0 mass % or more based on the total amount of the process liquid. The content of the cationic compound contained in the process liquid may be 40.0 mass % or less, 25.0 mass % or less, or 10.0 mass % or less based on the total amount of the process liquid. When the content of the cationic compound is within the above-mentioned range, precipitation or separation of the cationic compound in the process liquid is suppressed, and aggregation of the pigment and resin microparticles in the ink is accelerated to suppress absorption into apertures or inside of the fibers constituting the fabric. Consequently, the phenomenon that the color material penetrates in the rear surface direction of the printing surface is reduced, and the color development properties of the printed matter are improved.

4. INK JET RECORDING METHOD

An ink jet recording method according to the embodiment will now be described. The ink jet recording method according to the embodiment performs textile printing by discharging droplets of an ink composition with the above-described printer 1 (see FIG. 1) by an ink jet method to apply the droplets onto fabric 2 to form an image or the like.

Specifically, the ink jet recording method according to the embodiment includes an ink adhesion step of discharging the pigment textile printing ink composition from the nozzle of an ink jet head to adhere the ink composition to fabric. In the ink adhesion step, droplets of the ink composition discharged from the above-described ink jet head 3 (see FIG. 1) are landed on at least part of the fabric. In the embodiment, when the ink jet method is used in the ink adhesion step, for example, a plate necessary for analog textile printing, such as screen textile printing, is not required, and not only the application to small-volume production in great varieties is easy but also high-definition images, text, patterns, colors, etc. can be formed.

The fabric may be treated with a process liquid. When the fabric is treated with a process liquid, the components, such as the pigment, contained in the ink composition react with the cationic compound in the process liquid, and the ink components, such as the pigment, aggregate in a vicinity of the surface of the fabric 2. Consequently, the pigment less likely penetrates in the inside direction of the fabric 2, and the color development properties of the ink are improved.

The method for adhering the process liquid is not particularly limited as long as the process liquid is adhered to at least a partial region of fabric. Examples of the method for adhering the process liquid include immersion coating in which fabric is immersed in the process liquid; roller coating in which the process liquid is adhered using a brush, roller, spatula, roll coater, etc.; spray coating in which the process liquid is ejected with a spray device, etc.; and ink jet coating in which the process liquid is adhered by an ink jet method. In particular, immersion coating, roller coating, and spray coating may be used because of their simplicity in the device structure and quickness of adhesion of the process liquid.

In the ink adhesion step, the adhesion amount of the ink to the fabric 2 may be 1.5 mg/cm$^2$ or more and 6 mg/cm$^2$ or less or 2 mg/cm$^2$ or more and 5 mg/cm$^2$ or less per unit area of the fabric 2. When the adhesion amount of the ink is within the above-mentioned range, the color development properties of, for example, an image formed by textile printing are improved. In addition, the drying properties of the ink adhered to the fabric 2 are secured, and generation of blur in, for example, an image is reduced. When at first an undercoat is formed by, for example, a white ink composition on a previously dyed fabric, an adhesion amount higher than the above-mentioned amount of the white ink composition may be adhered.

After the ink adhesion step, a step of heating the ink adhered to the fabric 2 may be performed. The heating method is not particularly limited, and examples thereof include a heat press method, a normal-pressure steam method, a high-pressure steam method, and a thermofix method. The heat source for heating is not particularly limited, and, for example, an infrared lamp can be used. The heating temperature may be any temperature at which the resin particles of the ink are fused and the medium, such as water, volatilizes. For example, the heating temperature may be about 100° C. or more and about 200° C. or less, 170° C. or less, or 150° C. or less. Here, the heating temperature in the heating step is the surface temperature of the image or the like formed on the fabric 2. The heating temperature can be measured by the same method as that in the drying step. The heating time is not particularly limited and is, for example, 30 seconds or more and 20 minutes or less.

In the embodiment, recording is performed with the printer 1 including a pressure chamber and a circulation passage for circulating the ink composition in the pressure. Consequently, clogging by aggregates of the resin particles is suppressed, and the discharge stability can be improved. Thus, even if the content of the moisturizing component, such as polyhydric alcohol having a boiling point of 270° C. or more, is decreased, the discharge stability can be secured. Accordingly, it is possible to decrease the heating temperature.

After the heating step, a step of water-washing and drying the fabric 2 subjected to the textile printing may be performed. In the water-washing, components, such as the ink, that have not been fixed to the fabric 2 may be washed away using a hot soap solution or the like, as a soaping process, as necessary. By the steps described above, printed matter is manufactured.

As described above, in the ink jet recording method according to the embodiment, even if an ink in which the resin particles have glass transition temperature of 5° C. or less and the amount of a solvent having a high boiling point is small is used, aggregates are less likely generated by using a liquid discharge apparatus including a pressure chamber and a circulation passage for circulating the ink composition in the pressure chamber. Consequently, ink discharge stability is secured. In addition, since the content of the polyhydric alcohol having a boiling point of 270° C. or more can be decreased, it is possible to increase the contents of the pigment and the resin particles in the ink, resulting in improvement in the color development properties and abrasion resistance of the image.

Furthermore, when the resin particles have a glass transition temperature of 5° C. or less, the texture of printed matter is also improved. Thus, in the ink jet recording method according to the embodiment, discharge stability and abrasion resistance and texture can be compatible with each other.

5. EXAMPLES

The present disclosure will now be further specifically described by examples and comparative examples but is not limited to the examples. Incidentally, the "part(s)" and "%" in the examples and the comparative examples are based on mass unless otherwise specified.

5.1. Preparation of Ink Composition

Components were each put in a container so as to have a composition shown in Table 1 or 2, and mixed and stirred with a magnetic stirrer for 2 hours, and then further subjected to distribution treatment with a bead mill filled with zirconia beads having a diameter of 0.3 mm for sufficient mixing. After stirring for 1 hour, filtration through a 5-μm PTFE membrane filter was performed to give each ink. The numerical values in Tables 1 and 2 indicate mass % unless otherwise noted, and deionized water was added so that the total amount of each ink was 100 mass %. The numerical values of the pigment dispersion, crosslinking agent, and wax shown in Tables 1 and 2 indicate mass % of active components in terms of solid content. The numerical values in the parentheses of the polyhydric alcohol in Tables 1 and 2 represent boiling points.

Among the components shown in Tables 1 and 2, details of the components shown by names other than compound names are as follows.

Pigment

As the pigment, a cyan pigment dispersion prepared by the following preparation method was used.

C.I. Pigment Blue 15:3 (65 parts by mass, cyan pigment), Joncryl 611 (trade name of a styrene-acrylic acid dispersion resin manufactured BASF Japan Ltd., 35 parts by mass), potassium hydroxide (1.70 parts by mass), and ultrapure water (250 parts by mass) purified by an ion-exchange process and a reverse osmosis process were mixed and dispersed in a ball mill using zirconia beads for 10 hours, followed by filtration through a glass fiber filter GA-100 (trade name, manufactured by Advantec Toyo Kaisha, Ltd.) to remove coarse particles. The pigment solid content concentration was adjusted to 15 mass % to give a cyan pigment dispersion.

Resin Particles

TAKELAC (registered trademark) W-6110: manufactured by Mitsui Chemicals & SKC Polyurethanes Inc., polycarbonate urethane resin, Tg: −20° C., film elongation: 550%, film strength: 55 MPa SUPERFLEX 470: manufactured by DKS Co., Ltd., polycarbonate urethane resin, Tg: −31° C., film elongation: 640%, film strength: 40 MPa SUPERFLEX 840: manufactured by DKS Co., Ltd., polycarbonate urethane resin, Tg: 5° C., film elongation: 690%, film strength: 40 MPa SUPERFLEX 460: manufactured by DKS Co., Ltd., polycarbonate urethane resin, Tg: −21° C., film elongation: 750%, film strength: 25 MPa SUPERFLEX 650: manufactured by DKS Co., Ltd., polycarbonate urethane resin, Tg: −17° C., film elongation: 340%, film strength: 40 MPa SUPERFLEX 150: manufactured by DKS Co., Ltd., polycarbonate urethane resin, Tg: 40° C., film elongation: 330%, film strength: 45 MPa Bontighter HUX-380: manufactured by ADEKA Corporation, non-polycarbonate urethane resin, Tg: −5° C. to −35° C., film elongation: 500%, film strength: 38 MPa VINYBLAN 2682: manufactured by Nissin Chemical Co., Ltd., acrylic resin, Tg: −30° C.

Crosslinking Agent

EPOCROS (registered trademark) K2010E: manufactured by Nippon Shokubai Co., Ltd.

Wax

Hi-Tech E-9015: manufactured by TOHO Chemical Industry Co., Ltd., polyethylene wax emulsion Surfactant BYK (registered trademark)-348: manufactured by BYK-Chemie Japan K.K., polyether modified siloxane surfactant The film elongation and the film strength of resin particles were measured as follows. A resin was applied onto a polytetrafluoroethylene sheet such that the film thickness after drying was 500 μm and was dried at 20° C. and 65% RH for 15 hours, further at 80° C. for 6 hours, and at 120° C. for 20 minutes, and the resin was then peeled from the sheet to produce a resin film (test piece having a width of 10 mm and a length of 30 mm). The film elongation of the resulting resin film was then measured using a tensile tester at a measurement temperature of 20° C. and a measurement speed of 200 mm/min. In the measurement of the film elongation, the resin film was elongated, the length elongated until the resin film was broken was measured, and its rate was expressed in percent as the film elongation. The tensile strength at the time of being broken was defined as the film strength. Incidentally, the thickness of a coating film necessary for the measurement was determined by actual measurement with a micrometer (trade name "MDH-25M", manufactured by Mitutoyo Corporation). Tensilon Universal Testing Instrument RTC-1225A manufactured by Orientec Corporation was used as the tensile tester. As the glass transition point (Tg) of resin particles, the value measured by a differential scanning calorimeter (DSC) was used.

The film elongation and the film strength of an ink composition were measured as in the film elongation and the film strength of resin particles. The ink compositions of Examples 1 to 7 and 14 to 19 had a film elongation of 550% and a film strength of 55 MPa. The ink composition of Example 8 had a film elongation of 640% and a film strength of 40 MPa. The ink composition of Example 9 had a film elongation of 690% and a film strength of 40 MPa. The ink composition of Example 10 had a film elongation of 750% and a film strength of 25 MPa. The ink composition of Example 11 had a film elongation of 340% and a film strength of 40 MPa. The ink composition of Example 12 had a film elongation of 500% and a film strength of 38 MPa. The ink compositions of Comparative Examples 1, 2, and 4 to 6 had a film elongation of 550% and a film strength of 55 MPa.

TABLE 1

| | | | | Example 1 | Example 2 | Example 3 | Example 4 | Example 5 | Example 6 |
|---|---|---|---|---|---|---|---|---|---|
| Head | Presence of circulation structure | | | Yes | Yes | Yes | Yes | Yes | Yes |
| Ink composition | Pigment | Pigment dispersion | | 4.0 | 4.0 | 4.0 | 4.0 | 4.0 | 4.0 |
| | Resin particles | Polycarbonate urethane | TAKELAC W-6110 | 6.5 | 6.5 | 6.5 | 6.5 | 6.5 | 8.0 |
| | | | SUPERFLEX 470 | | | | | | |
| | | | SUPERFLEX 840 | | | | | | |
| | | | SUPERFLEX 460 | | | | | | |
| | | | SUPERFLEX 650 | | | | | | |
| | | | SUPERFLEX 150 | | | | | | |
| | | Urethane | Bontighter HUX-380 | | | | | | |
| | | Acryl | VINYBLAN 2682 | | | | | | |
| | Crosslinking agent | | EPOCROS K2010E | | | | | | |
| | Wax | | Hi-Tech E-9015 | | | | | | |

TABLE 1-continued

| | | | | | | | | |
|---|---|---|---|---|---|---|---|---|
| | Polyhydric alcohol | High boiling point (270° C. or more) | Glycerol (290° C.) | 15.0 | 10.0 | 6.0 | 8.0 | 5.5 | 15.0 |
| | | | Triethylene glycol (287° C.) | | | | | | |
| | | Moderate boiling point (less than 270° C.) | 3-Methyl-1,3-butanediol (203° C.) | 15.0 | 15.0 | 15.0 | 20.0 | 28.0 | 15.0 |
| | | | 1,3-Butanediol (203° C.) | | | | | | |
| | Others | Monovalent alcohol | Triethylene glycol monobutyl ether | 1.0 | 1.0 | 1.0 | 1.0 | 1.0 | 1.0 |
| | | Alkali | Triethanolamine | 0.5 | 0.5 | 0.5 | 0.5 | 0.5 | 0.5 |
| | | Surfactant | BYK348 | 0.3 | 0.3 | 0.3 | 0.3 | 0.3 | 0.3 |
| | Water | | Deionized water | Balance | Balance | Balance | Balance | Balance | Balance |
| Content of polyhydric alcohol having high boiling point based on total amount of polyhydric alcohols (mass %) | | | | 50.0% | 40.0% | 28.6% | 28.6% | 16.4% | 50.0% |
| Content ratio of polyhydric alcohol having high boiling point to resin particles (mass ratio) | | | | 2.31 | 1.54 | 0.92 | 1.23 | 0.85 | 1.88 |
| Viscosity of ink | | | | A | A | A | A | B | B |
| Discharge stability | | | | A | A | A | A | A | A |
| Friction fastness | | | | A | A | A | A | S | S |
| Texture | | | | A | A | A | A | A | A |

| | | | | Example 7 | Example 8 | Example 9 | Example 10 | Example 11 | Example 12 |
|---|---|---|---|---|---|---|---|---|---|
| Head | Presence of circulation structure | | | Yes | Yes | Yes | Yes | Yes | Yes |
| Ink composition | Pigment | Pigment dispersion | | 4.0 | 4.0 | 4.0 | 4.0 | 4.0 | 4.0 |
| | Resin particles | Polycarbonate urethane | TAKELAC W-6110 | 10.0 | | | | | |
| | | | SUPERFLEX 470 | | 6.5 | | | | |
| | | | SUPERFLEX 840 | | | 6.5 | | | |
| | | | SUPERFLEX 460 | | | | 6.5 | | |
| | | | SUPERFLEX 650 | | | | | 6.5 | |
| | | | SUPERFLEX 150 | | | | | | |
| | | Urethane | Bontighter HUX-380 | | | | | | 6.5 |
| | | Acryl | VINYBLAN 2682 | | | | | | |
| | Crosslinking agent | | EPOCROS K2010E | | | | | | |
| | Wax | | Hi-Tech E-9015 | | | | | | |
| | Polyhydric alcohol | High boiling point (270° C. or more) | Glycerol (290° C.) | 15.0 | 15.0 | 15.0 | 15.0 | 15.0 | 15.0 |
| | | | Triethylene glycol (287° C.) | | | | | | |
| | | Moderate boiling point (less than 270° C.) | 3-Methyl-1,3-butanediol (203° C.) | 15.0 | 15.0 | 15.0 | 15.0 | 15.0 | 15.0 |
| | | | 1,3-Butanediol (203° C.) | | | | | | |
| | Others | Monovalent alcohol | Triethylene glycol monobutyl ether | 1.0 | 1.0 | 1.0 | 1.0 | 1.0 | 1.0 |
| | | Alkali | Triethanolamine | 0.5 | 0.5 | 0.5 | 0.5 | 0.5 | 0.5 |
| | | Surfactant | BYK348 | 0.3 | 0.3 | 0.3 | 0.3 | 0.3 | 0.3 |
| | Water | | Deionized water | Balance | Balance | Balance | Balance | Balance | Balance |
| Content of polyhydric alcohol having high boiling point based on total amount of polyhydric alcohols (mass %) | | | | 50.0% | 50.0% | 50.0% | 50.0% | 50.0% | 50.0% |
| Content ratio of polyhydric alcohol having high boiling point to resin particles (mass ratio) | | | | 1.50 | 2.31 | 2.31 | 2.31 | 2.31 | 2.31 |
| Viscosity of ink | | | | B | A | A | A | A | A |
| Discharge stability | | | | A | A | A | A | A | A |
| Friction fastness | | | | S | B | A | B | B | B |
| Texture | | | | B | A | B | A | A | A |

TABLE 2

| | | | | Example 13 | Example 14 | Example 15 | Example 16 | Example 17 | Example 18 | Example 19 | Comparative Example 1 |
|---|---|---|---|---|---|---|---|---|---|---|---|
| Head | Presence of circulation structure | | | Yes | Yes | Yes | Yes | Yes | Yes | Yes | No |
| Ink composition | Pigment | Pigment dispersion | | 4.0 | 4.0 | 4.0 | 4.0 | 4.0 | 4.0 | 4.0 | 4.0 |
| | Resin particles | Polycarbonate urethane | TAKELAC W-6110 | | | 6.5 | 6.5 | 6.5 | 6.5 | 6.5 | 6.5 |
| | | | SUPERFLEX 470 | | | | | | | | |
| | | | SUPERFLEX 840 | | | | | | | | |
| | | | SUPERFLEX 460 | | | | | | | | |
| | | | SUPERFLEX 650 | | | | | | | | |
| | | | SUPERFLEX 150 | | | | | | | | |
| | | Urethane | Bontighter HUX-380 | | | | | | | | |
| | | Acryl | VINYBLAN 2682 | 6.5 | | | | | | | |

TABLE 2-continued

| | | | | | | | | | | |
|---|---|---|---|---|---|---|---|---|---|---|
| Crosslinking agent | | EPOCROS K2010E | | 3.0 | 3.0 | | | | | |
| Wax | | Hi-Tech E-9015 | | | 1.0 | 1.0 | | | | |
| Polyhydric alcohol | High boiling point (270° C. or more) | Glycerol (290° C.) | 15.0 | 15.0 | 15.0 | 15.0 | | 7.5 | 15.0 | 15.0 |
| | | Triethylene glycol (287° C.) | | | | | 15.0 | 7.5 | | |
| | Moderate boiling point (less than 270° C.) | 3-Methyl-1,3-butanediol (203° C.) | 15.0 | 15.0 | 15.0 | 15.0 | 15.0 | 15.0 | | 15.0 |
| | | 1,3-Butanediol (203° C.) | | | | | | | 15.0 | |
| Others | Monovalent alcohol | Triethylene glycol monobutyl ether | 1.0 | 1.0 | 1.0 | 1.0 | 1.0 | 1.0 | 1.0 | 1.0 |
| | Alkali | Triethanolamine | 0.5 | 0.5 | 0.5 | 0.5 | 0.5 | 0.5 | 0.5 | 0.5 |
| | Surfactant | BYK348 | 0.3 | 0.3 | 0.3 | 0.3 | 0.3 | 0.3 | 0.3 | 0.3 |
| Water | | Deionized water | Balance | Balance | Balance | Balance | Balance | Balance | Balance | Balance |
| Content of polyhydric alcohol having high boiling point based on total amount of polyhydric alcohols (mass %) | | | 50.0% | 50.0% | 50.0% | 50.0% | 50.0% | 50.0% | 50.0% | 50.0% |
| Content ratio of polyhydric alcohol having high boiling point to resin particles (mass ratio) | | | 2.31 | 2.31 | 2.31 | 2.31 | 2.31 | 2.31 | 2.31 | 2.31 |
| Viscosity of ink | | | A | B | B | B | A | A | A | A |
| Discharge stability | | | A | A | A | A | A | A | A | C |
| Friction fastness | | | B | S | S | SS | A | A | A | A |
| Texture | | | A | B | B | B | A | A | A | A |

| | | | | Comparative Example 2 | Comparative Example 3 | Comparative Example 4 | Comparative Example 5 | Comparative Example 6 |
|---|---|---|---|---|---|---|---|---|
| Head | Presence of circulation structure | | | No | Yes | Yes | Yes | No |
| Ink composition | Pigment | Pigment dispersion | | 4.0 | 4.0 | 4.0 | 4.0 | 4.0 |
| | Resin particles | Polycarbonate urethane | TAKELAC W-6110 | 10.0 | | 5.0 | 6.5 | 6.5 |
| | | | SUPERFLEX 470 | | | | | |
| | | | SUPERFLEX 840 | | | | | |
| | | | SUPERFLEX 460 | | | | | |
| | | | SUPERFLEX 650 | | | | | |
| | | | SUPERFLEX 150 | | 6.5 | | | |
| | | Urethane | Bontighter HUX-380 | | | | | |
| | | Acryl | VINYBLAN 2682 | | | | | |
| | Crosslinking agent | | EPOCROS K2010E | | | | | |
| | Wax | | Hi-Tech E-9015 | | | | | |
| | Polyhydric alcohol | High boiling point (270° C. or more) | Glycerol (290° C.) | 15.0 | 15.0 | 15.0 | 20.0 | 6.0 |
| | | | Triethylene glycol (287° C.) | | | | | |
| | | Moderate boiling point (less than 270° C.) | 3-Methyl-1,3-butanediol (203° C.) | 15.0 | 15.0 | 15.0 | 15.0 | 15.0 |
| | | | 1,3-Butanediol (203° C.) | | | | | |
| | Others | Monovalent alcohol | Triethylene glycol monobutyl ether | 1.0 | 1.0 | 1.0 | 1.0 | 1.0 |
| | | Alkali | Triethanolamine | 0.5 | 0.5 | 0.5 | 0.5 | 0.5 |
| | | Surfactant | BYK348 | 0.3 | 0.3 | 0.3 | 0.3 | 0.3 |
| | Water | | Deionized water | Balance | Balance | Balance | Balance | Balance |
| Content of polyhydric alcohol having high boiling point based on total amount of polyhydric alcohols (mass %) | | | | 50.0% | 50.0% | 50.0% | 57.1% | 28.6% |
| Content ratio of polyhydric alcohol having high boiling point to resin particles (mass ratio) | | | | 1.50 | 2.31 | 3.00 | 3.08 | 0.92 |
| Viscosity of ink | | | | B | A | A | B | A |
| Discharge stability | | | | C | A | A | A | C |
| Friction fastness | | | | S | A | C | C | A |
| Texture | | | | B | C | A | A | A |

5.2. Recording Method

White cotton broad as fabric being an object to be treated was padded with a pretreatment agent composed of UNISENCE (104 L, 6.7 parts, water-soluble cationic polymer manufactured by Senka Corporation) and water (93.3 parts) by a padding method at a drawing rate of 70% and was then dried at 120° C. for 5 minutes, followed by cooling to 25° C. to obtain pretreated fabric. Subsequently, an ink jet apparatus "SC-F2000" manufactured by Seiko Epson Corporation was modified. In Tables 1 and 2, in examples of "Presence of circulation structure: Yes", the ink jet head had an ink circulation structure including a pressure chamber and a circulation passage for circulating an ink composition in the pressure chamber shown in FIG. 2 or 3.

5.3. Test for Evaluation 5.3.1. Evaluation of Ink Viscosity

The temperature of each of the ink compositions prepared as described in paragraph 5.1. was adjusted to 25° C., and the static viscosity was measured using a viscoelasticity measuring apparatus MCR-series manufactured by Anton Paar GmbH at a shear rate of 200 (1/s) and was evaluated by the following evaluation criteria.

(Evaluation criteria)

A: the static viscosity of ink is 8 mPa·s or more and 12 mPa·s or less; and

B: the static viscosity of ink is less than 8 mPa·s or higher than 12 mPa·s.

5.3.2. Evaluation of Discharge Stability

A chart in which a solid image filled 5% of an area of 210 mm×297 mm was continuously printed on 15 white cotton broad cloths using the above-described ink jet apparatus at a resolution of 1,440×720 dpi. The resulting images were observed to verify whether discharge irregularity or nozzle omission was present or not, and the discharge stability was evaluated based on the nozzle omission during continuous printing. When the evaluation result is A, it can be determined that the effect of the present disclosure has been obtained.

(Evaluation Criteria)

A: No discharge irregularity is present, and

C: Discharge irregularity or a nozzle omitting discharge is present.

5.3.3. Evaluation of friction fastness

Each of the ink compositions was discharged onto one surface of the pretreated fabric as an object to be treated at an application density of 39 mg/inch$^2$ with the above-described ink jet apparatus and was then subjected to heating and drying treatment using a conveyor dryer "Economax D" manufactured by M&R at 160° C. for 5 minutes, followed by cooling to 25° C. to obtain textile printed matter. The resulting textile printed matter was sufficiently dried and was subjected to an abrasion test in which rubbing with a load of 200 g was performed 100 times using a Gakushin friction factness tester AB-301S manufactured by Tester Sangyo Co., Ltd. In accordance with Japanese Industrial Standard (JIS) JIS L0849 for verifying the degree of ink peeling, the evaluation was made at the dry level. When the evaluation result is B or higher, it can be determined that the effect of the present disclosure has been obtained.

(Evaluation criteria)

SS: grade 5

S: grade 4 to 5

A: grade 4

B: grade 3 to 4

C: grade 3

5.3.4. Evaluation of Texture

The texture of the textile printed matter prepared as described in paragraph 5.3.3. was evaluated by sensory evaluation. Specifically, five arbitrary panelists replied with either "the hand feeling is not inferior to that of the original fabric" or "the textile printed matter is stiff, and the hand feeling of the original fabric has been impaired", and evaluation was performed by the following criteria. When the evaluation result is B or higher, it can be determined that the effect of the present disclosure has been obtained.

(Evaluation criteria)

A: Four or more panelits replied with "the hand feeling is not inferior to that of the original fabric";

B: Three panelits replied with "the hand feeling is not inferior to that of the original fabric"; and C: Not more than two panelits replied with "the hand feeling is not inferior to that of the original fabric".

5.4. Evaluation Results

In every Comparative Example, the discharge stability and the abrasion resistance and texture were not compatible with each other. In contrast, in every Examples, the discharge stability and the abrasion resistance (friction fastness) and texture were compatible with each other. The results will be specifically described.

Examples 1 to 5 are examples in which the ratio of the polyhydric alcohol was varied. Examples 1 to 4 demonstrated that even if the content of glycerol was decreased, since the ink jet head had an ink circulation structure, the discharge stability was not reduced. Example 5 demonstrated that since the amount of glycerol was low based on the amount of the resin, the ink viscosity rating was decreased, but the friction fastness rating was increased. Examples 1, 6, and 7 demonstrated that an increase in the content of the resin decreased the ink viscosity rating but increased the friction fastness rating. Example 7 demonstrated that an excessively high content of the resin decreased the texture rating.

Examples 8 and 9 demonstrated that when the resin particles had a Tg of −25° C. or less, the friction fastness was decreased, and the texture was decreased with an increase in Tg. Examples 10 and 11 demonstrated that when the resin particles had a film elongation of higher than 600%, the friction fastness was decreased and that when the resin particles had a film elongation of less than 400%, the texture was decreased. Examples 12 and 13 demonstrated that when the resin particles were urethane resin or acrylic resin particles, the friction fastness was decreased. Examples 14 to 16 demonstrated that when a crosslinking agent or wax is contained, the viscosity and the texture were decreased, but the discharge stability was not decreased by the ink jet head having an ink circulation structure. In addition, the friction fastness rating was increased. Examples 17 to 19 demonstrated that even if the polyhydric alcohol was replaced by another polyhydric alcohol, the results of evaluation were not changed.

In Comparative Example 1, since the ink jet head did not have an ink circulation structure, the discharge stability was decreased compared to Example 1. In Comparative Example 2, since the content of the resin particles was higher than that in Comparative Example 1, although the ink viscosity rating and the texture rating were further decreased, the friction fastness was increased.

In Comparative Example 3, since the Tg was high, the texture was decreased. In Comparative Example 4, since the content of the resin particles was low, the friction fastness was decreased. In Comparative Example 5, since the content of glycerol was high, the friction fastness was decreased. In Comparative Example 6, since the ink jet head did not include an ink circulation structure, the discharge stability was decreased compared to Example 3.

The present disclosure is not limited to the above-described embodiments and can be variously modified. For example, the present disclosure includes configurations that are substantially the same as the configurations described in the embodiments, for example, configurations that have the same functions, methods, and results, or configurations that have the same purposes and effects. In addition, the present disclosure includes configurations in which non-essential parts of the configurations described in the embodiments are replaced. The present disclosure also includes configurations that achieve the same effects or the same purposes as those by the configurations described in the embodiments. The present disclosure further includes configurations obtained by adding known techniques to the configurations described in the embodiments.

What is claimed is:

1. A liquid discharge apparatus comprising:

an ink composition; and a liquid discharge section that includes at least a pair of nozzles for discharging the ink composition, wherein the ink composition is a pigment textile printing ink composition containing a resin particle, water, and an organic solvent;

the resin particle has a glass transition temperature of 5° C. or less and is contained in an amount of 6.5 mass % or more based on a total amount of the ink composition;

the ink composition contains a polyhydric alcohol having a boiling point of 270° C. or more as the organic solvent in an amount of 15.0 mass % or less based on the total amount of the ink composition; and the liquid discharge section further includes a first discharge portion and a second discharge portion that each include a pressure chamber that communicates with a respective one of the pair of nozzles, and a circulation passage located between the pressure chambers for circulating an ink composition in the pressure chambers, wherein the first discharge portion includes a first exhaust passage that provides communication between the pressure chamber of the first discharge portion and the circulation passage, and the second discharge portion includes a second exhaust passage that provides communication between the pressure chamber of the second discharge portion and the circulation passage.

2. The liquid discharge apparatus according to claim 1, wherein the ink composition has a film elongation of 400% or more and 600% or less and a film strength of 50 MPa or more.

3. The liquid discharge apparatus according to claim 1, wherein a content of the polyhydric alcohol having a boiling point of 270° C. or more is 10.0 mass % or less based on the total amount of the ink composition.

4. The liquid discharge apparatus according to claim 1, wherein a content of the polyhydric alcohol having a boiling point of 270° C. or more is 30.0 mass % or less based on a total amount of polyhydric alcohol.

5. The liquid discharge apparatus according to claim 1, wherein a content mass ratio of the polyhydric alcohol having a boiling point of 270° C. or more to a solid content of the resin particle is 0.9 or less.

6. The liquid discharge apparatus according to claim 1, wherein the resin particle is a urethane resin particle.

7. The liquid discharge apparatus according to claim 6, wherein the resin particle is a polycarbonate urethane resin particle.

8. The liquid discharge apparatus according to claim 1, wherein the ink composition further contains a crosslinking agent.

9. An ink jet recording method comprising:
an ink adhesion step of discharging a pigment textile printing ink composition containing a resin particle, water, and an organic solvent from at least a pair of nozzles of a liquid discharge section to adhere the ink composition to fabric, wherein the resin particle has a glass transition temperature of 5° C. or less and is contained in an amount of 6.5 mass % or more based on a total amount of the ink composition;

the ink composition contains a polyhydric alcohol having a boiling point of 270° C. or more as the organic solvent in an amount of 15.0 mass % or less based on the total amount of the ink composition; and the liquid discharge section further includes a first discharge portion and a second discharge portion that each include a pressure chamber that communicates with a respective one of the pair of nozzles, and a circulation passage located between the pressure chambers for circulating the ink composition in the pressure chambers, wherein the first discharge portion includes a first exhaust passage that provides communication between the pressure chamber of the first discharge portion and the circulation passage, and the second discharge portion includes a second exhaust passage that provides communication between the pressure chamber of the second discharge portion and the circulation passage.

10. A pigment textile printing ink composition to be adhered to fabric by being discharged from at least a pair of nozzles of a liquid discharge section including a first discharge portion and a second discharge portion that each include a pressure chamber that communicates with a respective one of the pair of nozzles, and a circulation passage located between the pressure chambers for circulating the ink composition in the pressure chambers, wherein the first discharge portion includes a first exhaust passage that provides communication between the pressure chamber of the first discharge portion and the circulation passage, and the second discharge portion includes a second exhaust passage that provides communication between the pressure chamber of the second discharge portion and the circulation passage, wherein the pigment textile printing ink composition contains a resin particle, water, and an organic solvent;

the resin particle has a glass transition temperature of 5° C. or less and is contained in an amount of 6.5 mass % or more based on a total amount of the pigment textile printing ink composition; and a polyhydric alcohol having a boiling point of 270° C. or more is contained as the organic solvent in an amount of 15.0 mass % or less based on a total amount of the ink composition.

* * * * *